(12) United States Patent
Tomita

(10) Patent No.: US 7,890,994 B2
(45) Date of Patent: Feb. 15, 2011

(54) STORAGE NETWORK SYSTEM

(75) Inventor: Aki Tomita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1874 days.

(21) Appl. No.: 10/974,783

(22) Filed: Oct. 28, 2004

(65) Prior Publication Data
US 2006/0053299 A1 Mar. 9, 2006

(30) Foreign Application Priority Data
Sep. 7, 2004 (JP) ............................. 2004-259952

(51) Int. Cl.
*G06F 17/30* (2006.01)
(52) U.S. Cl. ...................... 726/10; 707/787
(58) Field of Classification Search ............... 707/787
See application file for complete search history.

(56) References Cited

U.S. PATENT DOCUMENTS

| | | | |
|---|---|---|---|
| 6,058,389 A * | 5/2000 | Chandra et al. .................. 1/1 |
| 6,212,520 B1 * | 4/2001 | Maruyama et al. ............... 1/1 |
| 6,484,173 B1 | 11/2002 | O'Hare et al. |
| 6,564,215 B1 * | 5/2003 | Hsiao et al. ...................... 1/1 |
| 7,139,758 B1 * | 11/2006 | Laws et al. ....................... 1/1 |
| 2002/0049912 A1 * | 4/2002 | Honjo et al. ................. 713/201 |
| 2002/0091717 A1 * | 7/2002 | Shi et al. ...................... 707/201 |
| 2002/0147929 A1 * | 10/2002 | Rose ........................... 713/201 |
| 2003/0079008 A1 * | 4/2003 | Fujii et al. ................... 709/223 |
| 2005/0278342 A1 * | 12/2005 | Abdo et al. .................... 707/10 |

\* cited by examiner

*Primary Examiner*—David J Pearson
(74) *Attorney, Agent, or Firm*—Antonelli, Terry, Stout & Kraus, LLP.

(57) ABSTRACT

A storage network system (1) includes a sever (100), a storage device (300), and a management server (400). A device control processor (120) of the server (100) includes an authentication ID management unit (130). The authentication ID management unit (130) has an authentication ID management table (131) which manages an authentication ID held at present. A port controller (310) of the storage device (300) includes an access control unit (320). The access control unit (320) is provided with an access control table (321) indicative of a criterion which permits an access from the server (100). An access management unit (410) of the management server (400) has an operation schedule table (420) indicative of an operation schedule of operations from the server (100) to the storage device (300), and an access management table (421) which manages an operation permitted at present.

8 Claims, 16 Drawing Sheets

FIG. 5  FLOWCHART OF AUTHENTICATION ID CAPTURE PROCESS 500

FLOWCHART OF AUTHENTICATION ID ABORT PROCESS

FLOWCHART OF AUTHENTICATION ID INVALIDATE COMPLETION PROCESS 1300

STORAGE NETWORK SYSTEM

CLAIMS OF PRIORITY

The present application claims priority from Japanese application serial no. JP2004-259952, filed on Sep. 7, 2004, the content of which is hereby incorporated by reference into this application.

BACKGROUND OF THE INVENTION

The present invention relates to a storage network system including a server (computer) and a storage device, and particularly to control on an access from the server to the storage device.

Rules such as HIPPA (Health Insurance Portability and Accountability Act) Privacy Rule (U.S.A), HIPPA Security Rule (U.S.A), Act for Protection of Computer-Processed Personal Data (in Japan), which impose unauthorized access prevention/privacy protection on electronic information have recently been enforced one after the other in respective countries starting from U.S.A. A customer's demand for obtaining of conformity with such rules related to information security is running high in a storage market.

Meanwhile, since the development of an information technology for the information security is extremely fast, the highest information security countermeasures taken at a given time do not last for a long time as the highest one even for future. It has been pointed out that it is important that in a server and a storage device, log information related to access are collected continuously and security is ensured while monitoring the access using the log information. As for security assurance, for example, the function of preventing external penetration by hackers was in the mainstream up to now. However, the need for the function of preventing internal invasions inclusive a system manager in addition to the above external penetration has also been pointed out in recent years. In terms of consideration for avoiding a difficulty in management work, there is a tendency to give large access rights such as a remote copy that copies data between storage devices, etc. to the system manager. The system manager per se is placed in such a situation that the system manager can result in a security hole (weak point of security).

In a related art (e.g., U.S. Pat. No. 6,484,173 (seventh section and thirteenth to fifteenth sections), each of port controllers of a storage device determines, based on execution-allowed access control information (requestor ID (ID of access request issuance origin), access type, device ID) registered inside the device, whether an access request received by the corresponding port should be granted or permitted. The requestor ID includes a hardware ID set in each server device unit and a group ID set in each user/group unit.

SUMMARY OF THE INVENTION

However, the related art is accompanied by the problem that since the access control level assured by the access control information is placed under restraint of a server management system or server management environments of units (server and user) of requestors ID, etc., it is difficult to change only the access control level relative to the storage device, independent of the server management system. That is, when a rule related to access control on data is newly issued, the server management system (whole system) should also be changed eventually.

Meanwhile, the unauthorized access is an access by an access-unpermitted person to electronic information. The violation of privacy is to utilize and provide collected and stored electronic information, other than the intended purpose. For example, a system manager having a remote copy right for the purpose of backup has the remote copy right with the backup as the intended purpose but should not be provided with the right of performing a remote copy with a leak of information as the purpose. In the related art, however, the remote copy right would be given to each device in the requestor ID unit. That is, the related art has a problem in that it is difficult to dynamically change the access right of the same user in accordance with an operation schedule phase for the purpose of preventing the unauthorized access other than assumed uses.

In order to solve the above problems, the present applicant proposes the following embodiment. Described specifically, there is provided a storage network system having a configuration wherein a sever which executes an application program and issues an access list related to the input/output of data with its execution, and a storage device which receives the access list issued from the server and performs the input/output of data in accordance with the access list are connected to one another via a network. The storage network system includes an access management unit included in the server or the storage device, which generates and distributes an authentication ID in accordance with an operation phase of the storage device, with respect to an access list comprising an identification of a requestor that requests an access to the storage device, a type of the access and a range intended for the access, an authentication ID management unit included in the server, which adds the authentication ID acquired from the access management unit to the access list issued from the server to the storage device, and an access control unit included in the storage device, which, when the access list added with the authentication ID is received, permits an access by the received access list where the authentication ID distributed from the access management unit, an identification of a requestor corresponding to the authentication ID, the type of access and a range intended for the access, and the authentication ID set to the access list, an identification of a requestor, the type of access and a range intended for the access coincide with one another respectively.

Also, an embodiment may be adopted wherein the storage network system is configured so as to include a management server which performs management related to the access from the server to the storage device, and the access management unit is configured so as to be included in the management server.

Incidentally, the terms "access list", "identification of requester", "type of access" and "range intended for access" according to claims respectively correspond to the terms "access list", "user ID", "type of data input/output process" and "device ID intended for data input/output process" in the Description of the Preferred Embodiments.

DESCRIPTION OF THE PREFERRED EMBODIMENTS

A preferred embodiment of the present invention will hereinafter be explained in detail with reference to the accompanying drawings.

<<Configuration of System>>

Figure 1:
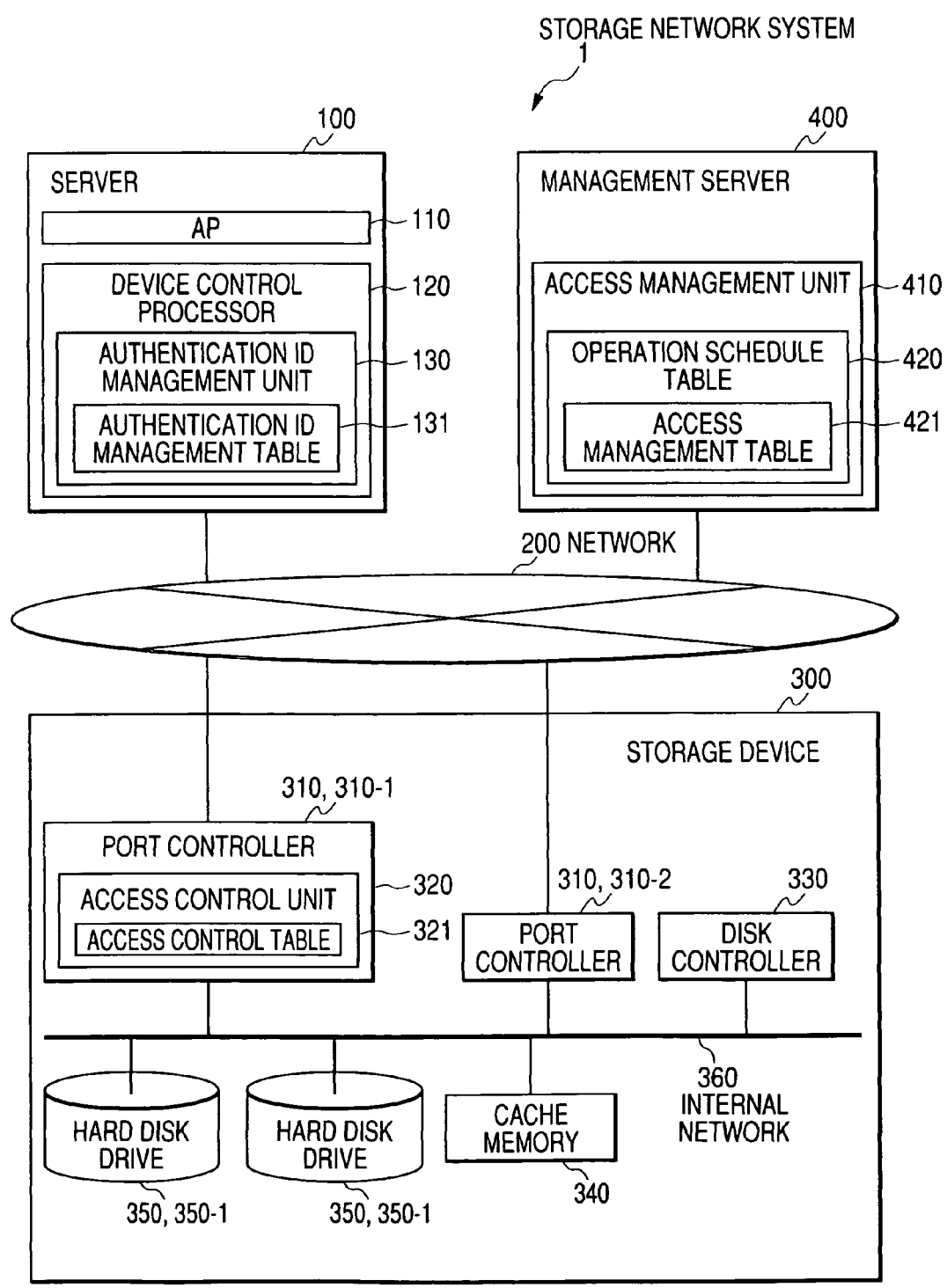
FIG. 1 is a configurational example of a storage network system including a storage device.

FIG. 1 shows a configuration of a storage network system including a storage device with an access control function, according to the present embodiment. The storage network system 1 comprises a server 100, a storage device 300, a management server 400, etc. connected to one another through a network 200. The network 200 is realized by an IP (Internet Protocol) network and an FC (Fiber Channel). Incidentally, although the server 100, the storage device 300 and the management server 400 are illustrated one by one in FIG. 1, such a configuration that at least one component or constituent element is provided two or more may be taken. For example, such a configuration that the server 100 is connected two or more may be adopted.

The server 100 executes an application program (hereinafter called "AP") 110 and accesses data stored in the storage device 300 with its execution. When the server 100 obtains access to the data, it issues a command related to the input/output of the data to the storage device 300. The server 100 is provided with the AP 110 and a device control processor 120. The AP 110 obtains access to the storage device 300 via the device control processor 120. The device control processor 120 provides an access interface to the storage device 300 through the AP 110. The device control processor 120 includes an authentication ID management unit 130 which executes access control. The authentication ID management unit 130 is provided with an authentication ID management table 131 and performs a process for acquiring or capturing an authentication ID from the management server 400, a process for issuing invalidation requisition of the authentication ID to the management server 400, etc. The authentication ID management table 131 is a table which manages the authentication ID held by the authentication ID management unit 130 at present.

The storage device 300 accepts the command issued from the server 100 and performs the input/output of data according to the contents of the command. The storage device 300 comprises port controllers 310 (310-1 and 310-2), a disk controller 330, a cache memory 340, hard disk drives 350 (350-1 and 350-2), etc., connected to one another via an internal network 360.

The port controller 310 (310-1, 310-2) receives a data read/write command from the server 100 and swaps an access control management command with the management server 400. Also the port controller 310 (310-1, 310-2) performs the transfer of data among the server 100, the network 200 and the cache memory 340 in accordance with the data read/write command received from the server 100. The disk controller 330 reads data from the corresponding hard disk drive 350 to the cache memory 340. The disk controller 330 further writes to the hard disk drive 350 data written in the cache memory 340 by the port controller 310. That is, the disk controller 330 controls the transfer of data between the cache memory 340 and the hard disk device 350. The cache memory 340 temporarily stores the data transferred from the port controller. The corresponding hard disk drive 350 (350-1, 350-2) stores the data transferred from the cache memory 340. The internal network 360 is realized by buses and switches, and connects between the respective sections lying in the storage device 300 and acts as go-between the respective sections for data transfer.

Incidentally, the port controller 310 includes an access control unit 320 which performs control on access from the server 100. The access controller 320 is provided with an access control table 321 and executes control on access from the server 100 on the basis of the access control table 321. The access control table 321 is a table which indicates a criterion as to whether the access from the server 100 is permitted.

The management server 400 has a management function related to the access from the server 100 to the storage device 300, the management function being realized by executing a program corresponding to the access management unit 410. The access management unit 410 exercises control over the authentication ID management unit 130 of the server 100 and the access controller 310 of the storage device 300. The access management unit 410 includes an operation schedule table 420 and an access management table 421 and performs a process for distributing an authentication ID to the storage device 300, a process for issuing an authentication ID invalidate command to the server 100 and the storage device 300, etc. The operation schedule table 420 is a table which manages an operation schedule descriptive of operations from the server 100 to the storage device 300. Here, the term operations means data input/output processes such as reading of data, writing of data, a remote copy, etc. The access management table 421 is a table which manages the currently-permitted operations from the server 100 to the storage device 300

<<Configuration of Table>>

Figure 2:
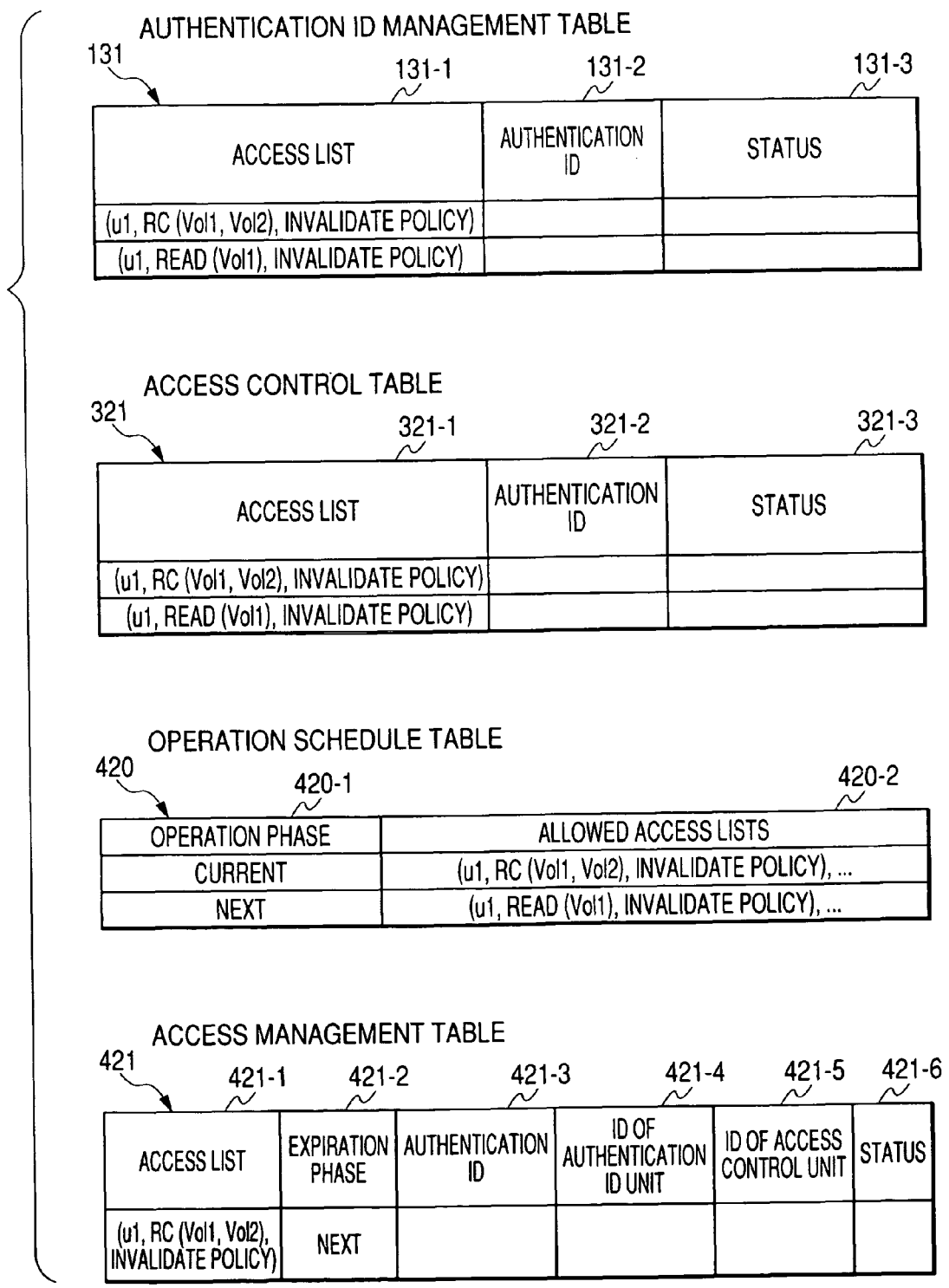
FIG. 2 is a diagram showing a configurational example illustrative of tables employed in an embodiment.

FIG. 2 shows configurations of tables according to the present embodiment. The authentication ID management table 131, access control table 321, operation schedule table 420 and access management table 421 will be explained with reference to FIG. 2.

The authentication ID management table 131 is a table which manages authentication IDs held in the authentication ID management unit 130 of the server 100 at present. The authentication ID management table 131 comprises an access list 131-1, an authentication ID 131-2 and a status 131-3.

The access list 131-1 is information which specifies an operation and comprises user IDs, the contents of operations and invalidate policies. The user ID is a number inherent in each user who makes use of the server 100. Described specifically, it is given from the AP 110. As one example thereof, "u1" is shown in FIG. 2. The contents of operations indicate the type of data input/output process to be actually executed and a target device ID (number inherent in each volume). "RC (Vol1 and Vol2)" shown in FIG. 2 means that the contents of operation is a Remote Copy from the device ID "Vol1" to "Vol2". "Read (Vol1)" means that the contents of operation is reading from the device ID "Vol1". The invalidate policy is used to describe the operation at the invalidation of an authentication ID. The invalidate policies conceivably include a policy in which when an authentication ID abort command (whose details will be described later) is received, "invalidation is required" is made until the operation being in execution is ended, a policy in which the operation being in execution is aborted upon its reception, etc.

The authentication ID 131-2 is a number inherent in each access list and is distributed from the management server 400.

The status 131-3 indicates the state of operation of each access list 131-1 in the server 100. The status 131-3 includes a state in which the access list 131-1 is executable or allowed, a state in which the access list 131-1 is in operation, a state placed in requiring invalidation, in which the authentication ID abort command is transmitted to the management server 400 and its reply is placed in waiting, and a state being in wait for invalidation because the access list 131-1 is in operation when an authentication ID invalidate command is received from the management server 400.

The access control table 321 is a table which manages each authentication ID currently held in the port controller 310 of the storage device 300. The access control table 321 comprises an access list 321-1, an authentication ID 321-2, and a status 321-3. The access list 321-1 is identical to the access list 131-1 of the authentication ID management table 131. The authentication ID 321-2 is identical to the authentication ID 131-2 of the authentication ID management table 131. The status 321-3 indicates the state of operation of the access list 321-1 in the storage device 300. The status 321-3 includes a state in which the access list 321-1 is allowed, a state in which the access list 321-1 is in operation, and a state being in wait for invalidation because the access list 321-1 is in operation when the authentication ID invalidate command is received from the management server 400.

The operation schedule table 420 is a table which manages an operation schedule of operations from the server 100 to the storage device 300 by the access management unit 410 of the management server 400. The operation schedule table 420 comprises an operation phase 420-1 and allowed access lists 420-2. The operation phase 420-1 indicates phases for an operation schedule of operations effected on the storage device 300 by the server 100. As examples of the phases, "Current" and "Next" are illustrated in FIG. 2. In practice, there are provided a data input/output (operation in work) with the execution of the AP 110, a data check, its back up (operations at night and on holiday), etc. The allowed access lists 420-2 indicate access lists (one or more access lists) executable or allowed in the operation phase 420-1.

Incidentally, a method of setting the operation schedule table 420 of the management server 400 conceivably includes (1) a method of allowing a storage manager to create information about an operation schedule on the basis of various settings of storage management software and causing the storage manager to set it to the management server 400 manually, (2) a method of causing the management server 400 per se to inquire storage management software of various settings, thereby creating the operation schedule table 420, etc.

The access management table 421 is a table which manages a currently-permitted operation from the server 100 to the storage device 300 by the access management unit 410 of the management server 400. The access management table 421 comprises an access list 421-1, an expiration phase 421-2, an authentication ID 421-3, an ID 421-4 of the authentication ID management unit, an ID 421-5 of the access control unit, and a status 421-6.

The access list 421-1 is identical to the access list 131-1 of the authentication ID management table 131. The expiration phase 421-2 indicates the final operation phase (expiration date) at which the access list 421-1 is executable continuously in accordance with the authentication ID 421-3. The authentication ID 421-3 is identical to the authentication ID 131-2 of the authentication ID management table 131. The ID 421-4 of the authentication ID management unit indicates an ID of the authentication ID management unit 130 for the server 100 corresponding to a destination to distribute the authentication ID 421-3. Described specifically, this ID is a port number corresponding to the corresponding program of the authentication ID management unit 130.

The ID 421-5 of the access control unit indicates an ID of the access control unit 320 of the storage device 300, corresponding to a destination to distribute the authentication ID 421-3. This ID is a number inherent in the access control unit 320. If the network 200 is of an IP network, then the ID is a port number corresponding to the corresponding program of the access control unit 320. The status 421-6 indicates a state of the access list 421-1 for the management server 400. The status 421-6 includes a state in which an authentication ID corresponding to the access list 421-1 is capable of being issued to the server 100, a state (requiring invalidation of authentication ID management unit) in which the reception of an invalidation completion command (whose details will be described later) from the authentication ID management unit 130 of the server 100 is placed in waiting, and a state (requiring invalidation of access control unit) in which the reception of an invalidation completion command (whose details will be described later) from the access control unit of the storage device 300 is placed in waiting.

<<Configurations of Command and Reply>>

Figure 3:
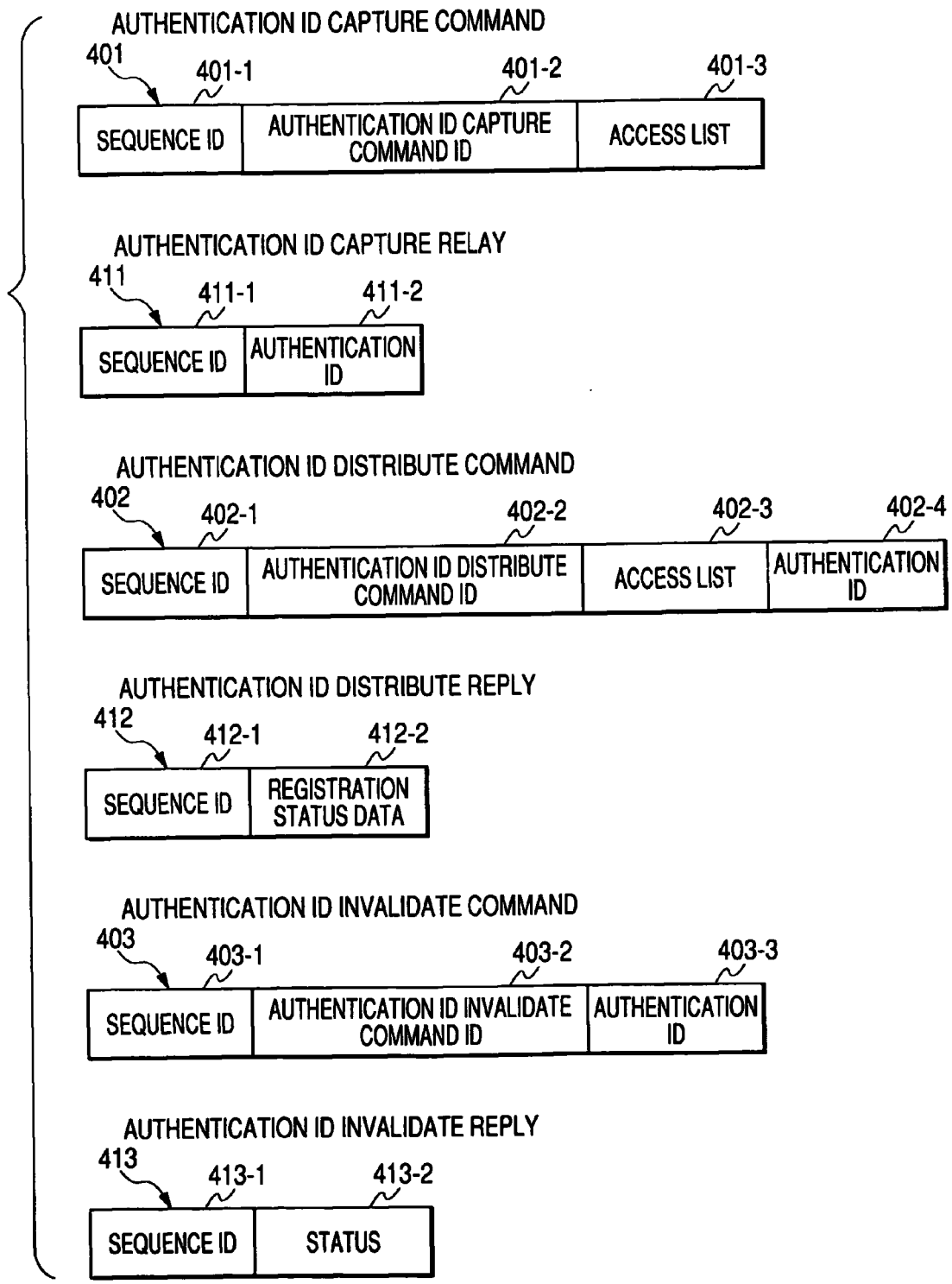
FIG. 3 is a diagram showing a configurational example illustrative of commands and replies employed in the embodiment.
Figure 4:
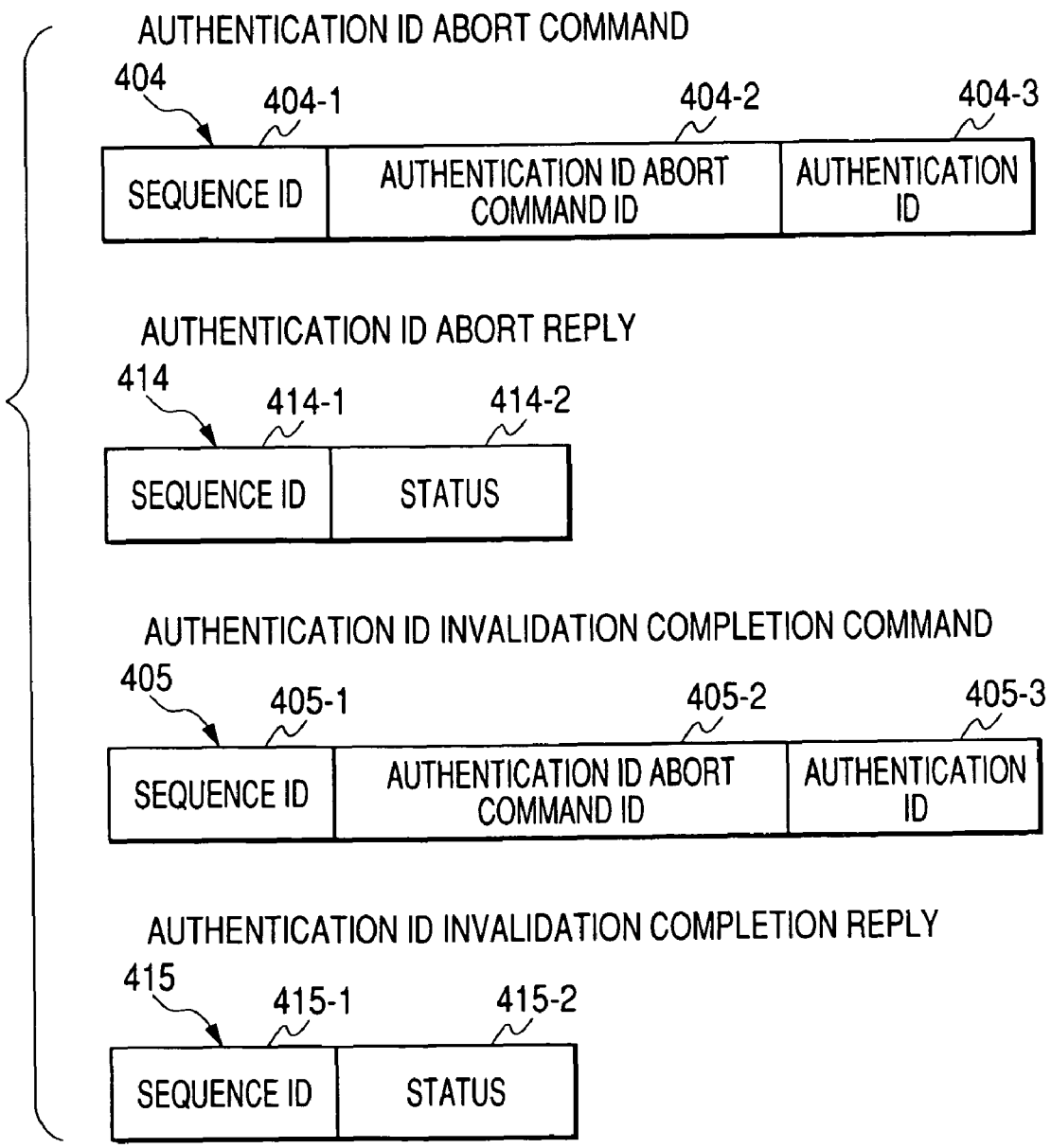
FIG. 4 is a diagram depicting a configurational example illustrative of commands and replies employed in the embodiment.

FIGS. 3 and 4 show configurations of commands and replies according to the embodiment of the present invention. An authentication ID capture command 401 and its reply 411, an authentication ID distribute command 402 and its reply 412, and an authentication ID invalidate command 403 and its reply 413 will be explained with reference to FIG. 3.

The authentication ID capture command 401 is issued from the authentication ID management unit 130 of the server 100 to the access management unit 410 of the management server 400 to get or capture an authentication ID corresponding to an access list. The authentication ID capture command 401 comprises a sequence ID 401-1, an authentication ID capture command ID 401-2, and an access list 401-3. The sequence ID 401-1 is an inherent number for identifying each command. Other commands are also similar thereto. The authentication ID capture command ID 401-2 is a command ID showing that the command is of an authentication ID capture command. The access list 401-3 is an access list intended for requiring of an issuance of an authentication ID. The access list 401-3 is identical in configuration and contents to the access list 131-1 of the authentication ID management table 131 shown in FIG. 2.

The authentication ID capture reply 411 is sent back from the access management unit 410 of the management server 400 to the authentication ID management unit 130 of the server 100 as a reply corresponding to the authentication ID capture command 401. The authentication ID capture replay 411 is made up of a sequence ID 411-1 and an authentication ID 411-2. The sequence ID 411-1 is an inherent number for identifying each reply and set to the same value as the sequence ID 401-1 of the corresponding authentication ID capture command 401. Other replies are also similar thereto. The authentication ID 411-2 is of an authentication ID applied to the access list 401-3 of the authentication ID capture command 401.

The authentication ID distribute command 402 is issued from the access management unit 410 of the management server 400 to the access control unit 320 of the storage device 300 to notify the corresponding authentication ID. The authentication ID distribute command 402 comprises a sequence ID 402-1, an authentication ID distribute command ID 402-2, an access list 402-3 and an authentication ID 402-4. The authentication ID distribute command ID 402-2 is a command ID showing that the command is of an authentication ID distribute command. The access list 402-3 and authentication ID 402-4 are respectively equivalent to the access list 401-3 received by the access management unit 410 of the management server 400 and the authentication ID 411-2 applied thereto.

The authentication ID distribute reply 412 is sent back from the access control unit 320 of the storage device 300 to the access management unit 410 of the management server 400 as a reply corresponding to the authentication ID distribute command 402. The authentication ID distribute reply 412 comprises a sequence ID 412-1 and registration status data 412-2. The registration status data 412-2 indicates whether the access control unit 320 has registered the distributed authentication ID therein. Since the authentication ID cannot be registered due to the occurrence of a failure or the like, for example although "registered" is normally set to the registration status data 412-2, "unregistered" might be set thereto.

The authentication ID invalidate command 403 is issued from the access management unit 410 of the management server 400 to the authentication ID management unit 130 of the server 100 or the access control unit 320 of the storage device 300 to invalidate the corresponding authentication ID. The authentication ID invalidate command 403 comprises a sequence ID 403-1, an authentication ID invalidate command ID 403-2, and an authentication ID 403-3. The authentication ID invalidate command ID 403-2 is of a command ID showing that the command is of an authentication ID invalidate command. The authentication ID 403-3 is of an authentication ID intended for invalidation.

The authentication ID invalidate reply 413 is sent back from the authentication ID management unit 130 of the server 100 or the access control unit 320 of the storage device 300 to the access management unit 410 of the management server 400 as a reply corresponding to the authentication ID invalidate command 403. The authentication ID invalidate reply 413 comprises a sequence ID 413-1 and a status 413-2. The status 413-2 is a state of an authentication ID intended for invalidation at the server 100 or the storage device 300. The status 413-2 includes a state (invalidation completion) in which an invalidate process has been finished and a waiting state (invalidation is required) of the invalidate process.

An authentication ID abort command 404 and its reply 414, and authentication ID invalidation completion command 405 and its reply 415 will next be explained with reference to FIG. 4.

The authentication ID abort command 404 is issued from the authentication ID management unit 130 of the server 100 to the access management unit 410 of the management server 400 to request the invalidation of the corresponding authentication ID. The authentication ID abort command 404 comprises a sequence ID 404-1, an authentication ID abort command ID 404-2 and an authentication ID 404-3. The authentication ID abort command ID 404-2 is a command ID indicating that the command is of an authentication ID abort command. The authentication ID 404-3 is an authentication ID intended for requirement of its invalidation.

The authentication ID abort reply 414 is sent back from the access management unit 410 of the management server 400 to the authentication ID management unit 130 of the server 100 as a reply corresponding to the authentication ID abort command 404. The authentication ID abort reply 414 comprises a sequence ID 414-1 and a status 414-2. The status 414-2 is a state of an authentication ID intended for invalidation at the storage device 300. The status 414-2 includes a state (invalidation completion) in which an invalidate process has been finished, and a state of "invalidation is required" indicating that an invalidate process is in a waiting state.

The authentication ID invalidation completion command 405 is issued from the authentication ID management unit 130 of the server 100 or the access control unit 320 of the storage device 300 to the access management unit 410 of the management server 400 to notify it that the authentication ID placed in the state of requiring invalidation has been invalidated. The authentication ID invalidation completion command 405 comprises a sequence ID 405-1, an authentication ID invalidation completion command ID 405-2 and an authentication ID 405-3. The authentication ID invalidation completion command ID 405-2 is a command ID showing that the command is of an authentication ID invalidation completion command. The authentication ID 405-3 is of an invalidated authentication ID.

The authentication ID invalidation completion reply 415 is sent back from the access management unit 410 of the management server 400 to the authentication ID management unit 130 of the server 100 or the access control unit 320 of the storage device 300. The authentication ID invalidation completion reply 415 comprises a sequence ID 415-1 and a status 415-2. The status 415-2 is placed in a state in which the invalidate process of the designated authentication ID has been ended. The status 415-2 includes an invalidation completion state of the authentication ID and an abnormal end state based on an error value, etc.

Incidentally, if the network 200 is of an IP network, then the port number corresponding to the corresponding program of the authentication ID management unit 130 of the server 100, the access control unit 320 of the storage device 300 or the access management unit 410 of the management server 400 may be designated to each command and each reply in order to define or clarify a transmitting destination or receiver for each command and reply.

<<Processing of System>>

A summary of processing of the entire system will now be explained in brief (suitably refer to FIG. 1). Each of the servers 100 obtains access to its corresponding storage device 300 to make use of data stored in the storage device 300 (or to store data in the storage device 300, for example). In this case, each of the servers 100 confirms whether information (e.g., ID or password used for authentication, which is hereinafter called "authentication ID") necessary for access to the storage device 300 is stored therein.

When the information on the authentication ID is not stored therein, each of the servers 100 transmits an authentication ID's request to its corresponding management server 400. The management server 400 determines, based on the request from each server 100 whether the sending of the authentication ID should be made. Described specifically, the management server 400 judges, using information (e.g., operation schedule table to be described later) held therein whether processes (such as copy, reading and writing of data, a remote copy thereof, etc.) that each server 100 intends to effect them on the storage device 300, are permitted for the server 100 at that time.

When it is found from the result of its judgement that the sending of the authentication ID is adequate, the management server 400 creates an authentication ID for the server 100 having transmitted the request, and an authentication ID on the storage device 300 side, corresponding to the authentication ID, and transmits them to the server 100 and the storage device 300.

The server 100 having received the authentication ID therein obtains access to the storage device 300 by use of the received authentication ID. The storage device 300 having received the access confirms (authenticates) the access right of the server 100, using information about the authentication ID received from the management server 400 and performs reading of data, etc.

Incidentally, the management server 400 manages the expiration date or phase of the authentication ID transmitted to each of the server 100 and the storage device 300, based on the information such as the operation schedule. Described specifically, when the authentication ID (e.g., when the time in the morning is reached under an authentication ID related to a backup process, which is approved at night alone) made unnecessary from the information such as the operation schedule exists, the management server 400 provides instructions for deletion of the authentication IDs made unnecessary for the each server 100 and the storage device 300.

Figure 14:
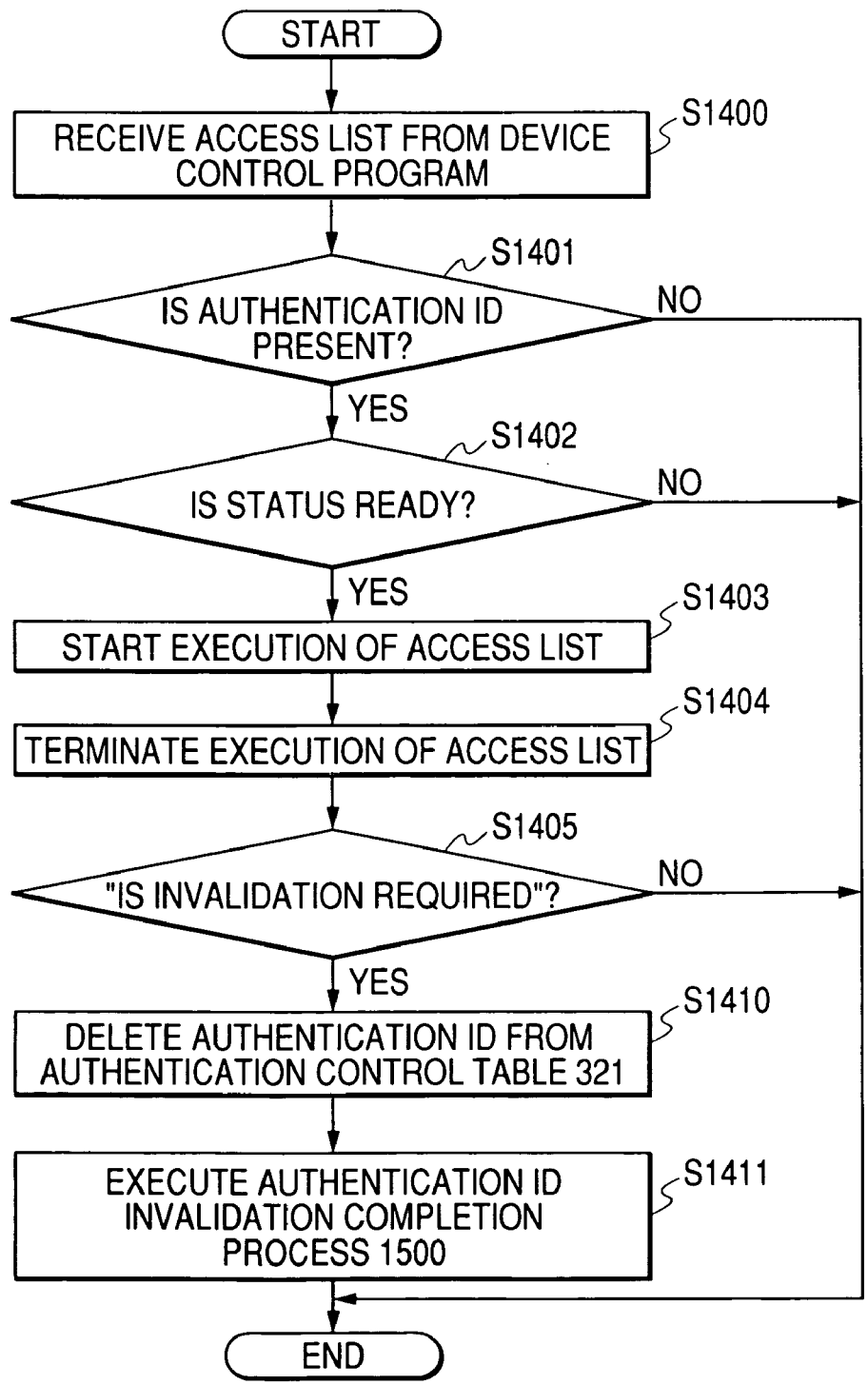
FIG. 14 is a flowchart showing an example of an access list execution process according to the embodiment.
Figure 15:
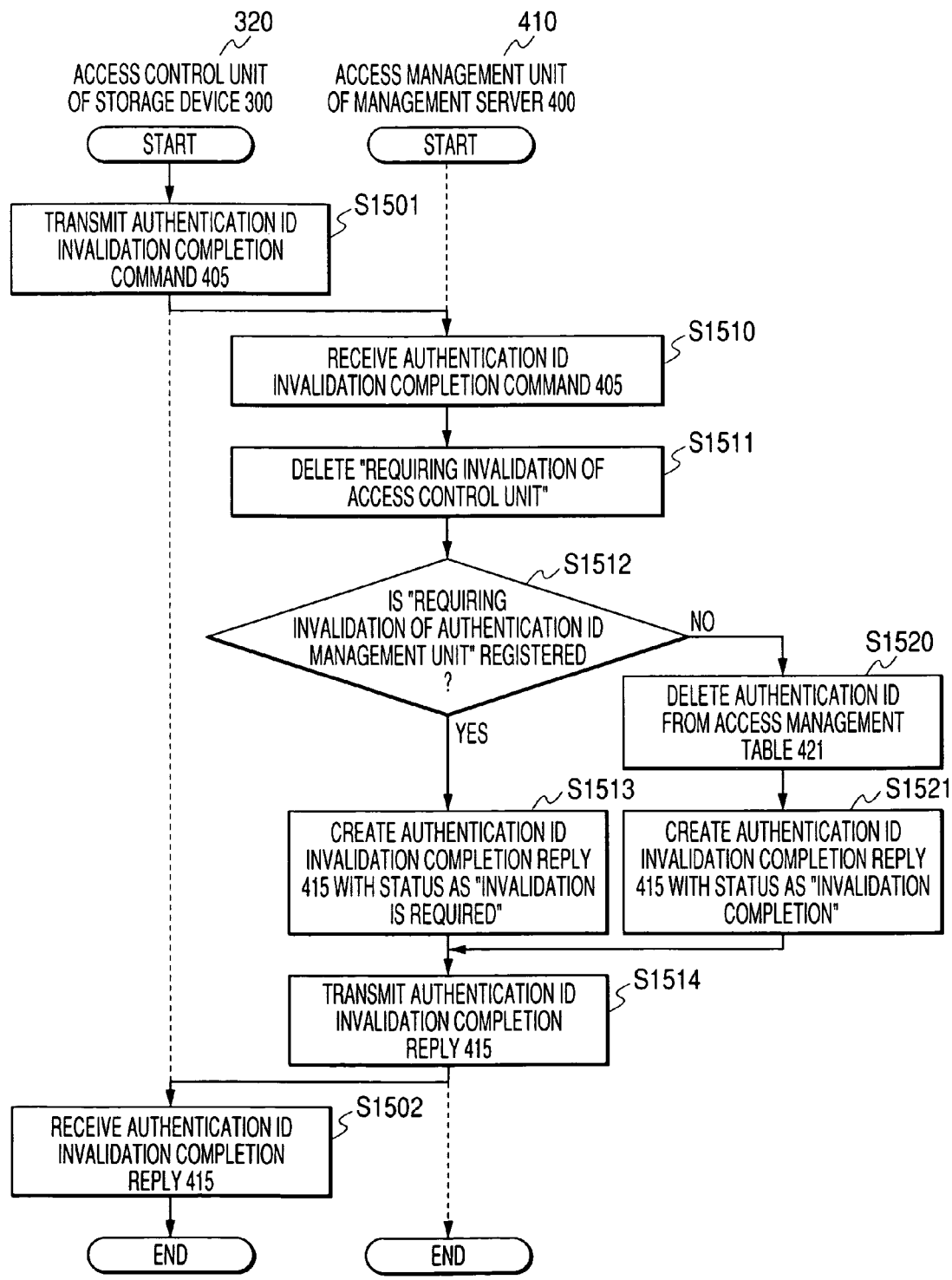
FIG. 15 is a flowchart illustrating an example of an authentication ID invalidation completion process according to the embodiment.
Figure 16:
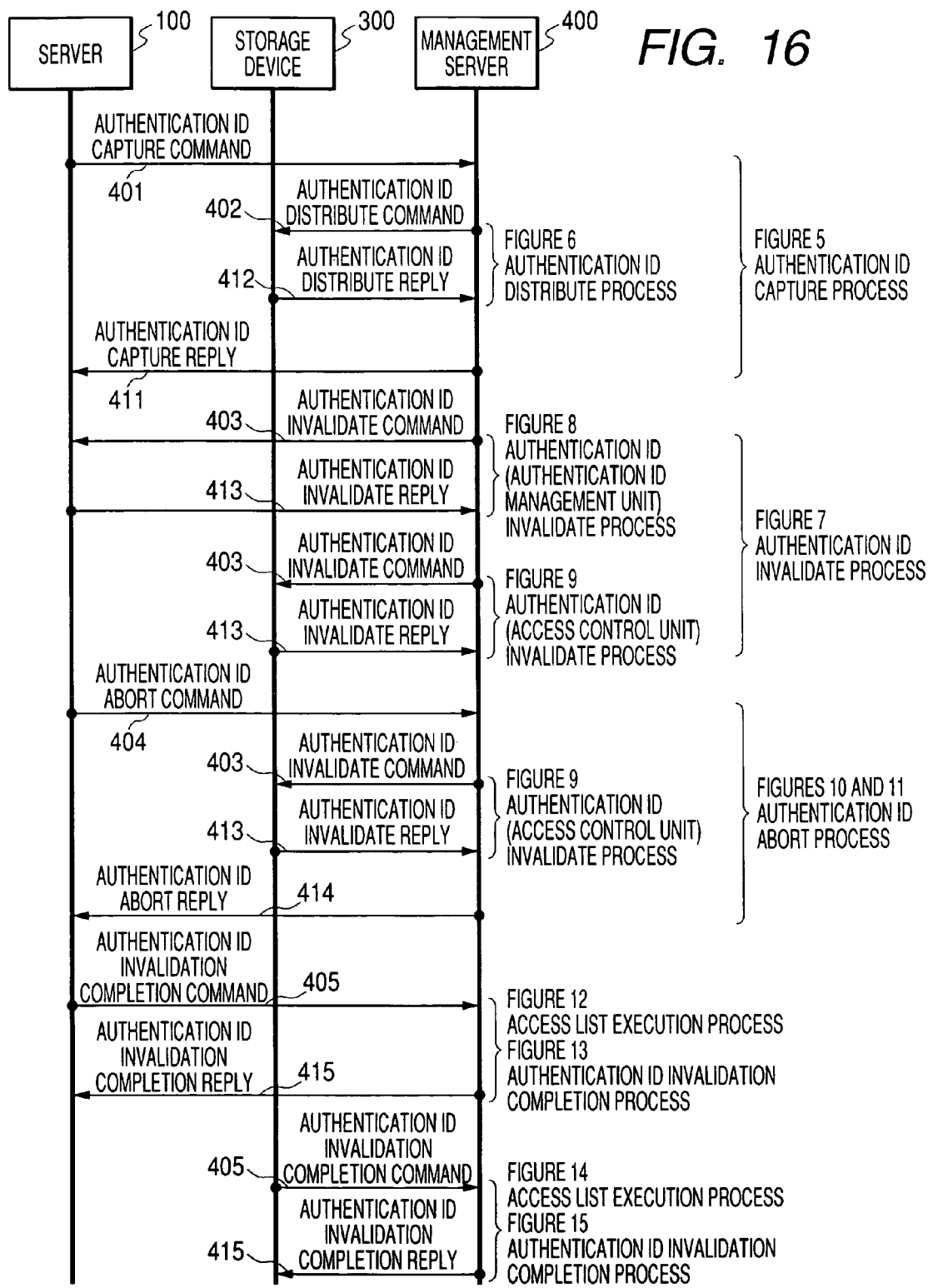
FIG. 16 is a diagram showing the exchange of the commands and replies employed in the embodiment with one another and the correspondence between these and the respective processes shown in FIGS. 5 through 15.

FIGS. 5 through 15 respectively show processes of the server, storage device and management server in the storage network system according to the present embodiment. FIG. 16 shows the exchange of the commands and replies among the server, storage device and management server and the correspondence between these and the respective processes shown in FIGS. 5 through 15. Incidentally, the detailed description of FIG. 16 will be omitted. The respective processes will hereinafter be explained with reference to FIGS. 5 through 15 (suitably refer to FIGS. 1 through 4).

Figure 5:
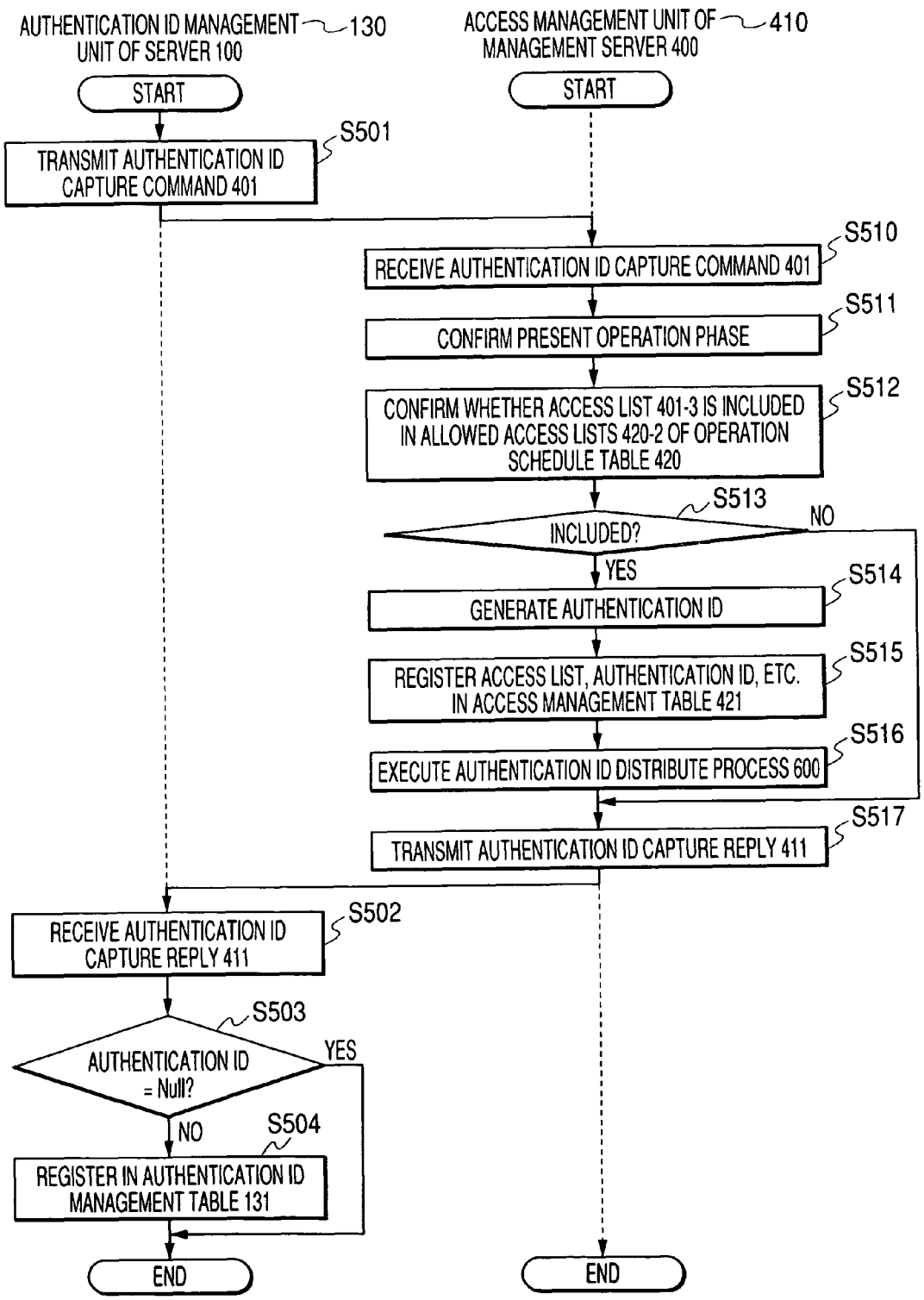
FIG. 5 is a flowchart showing an example of an authentication ID capture process according to the embodiment.

An authentication ID get or capture process according to the present embodiment will be described with reference to a flowchart shown in FIG. 5. The authentication ID capture process 500 is performed between the authentication ID management unit 130 of the server 100 and the access management unit 410 of the management server 400.

Firstly, the authentication ID management unit 130 transmits an authentication ID capture command 401 to the access management unit 410 (Step S501).

When the access management unit 410 receives the authentication ID capture command 401 therein (Step S510), the access management unit 410 confirms the present operation phase 420-1 by reference to the corresponding operation schedule table 420 (Step S511). The access management unit 410 confirms whether an access list 401-3 designated by the received authentication ID capture command 401 is included in the corresponding allowed access lists 420-2 of the present operation phase 420-1 (e.g., "Current") at the operation schedule table 420 (Step S512). When no access list is not included therein (the answer is found to be No of Step S513), the access management unit 410 sets Null to the corresponding authentication ID 411-2 of an authentication ID capture reply 411 and transmits the authentication ID capture reply 411 to the authentication ID management unit 130 (Step S517).

When the access list is included therein (the answer is found to be Yes of Step S513), the access management unit 410 generates an authentication ID (Step S514) and registers in the access management table 421 an access list 421-1, an expiration phase 421-2, the generated authentication ID 421-3, an ID 421-4 of the authentication ID management unit which distributes the authentication ID 421-3, and an ID 421-5 of the access control unit (Step S515). At this time, a state in which the authentication ID is issuable, is set to the corresponding status 421-6. Then, the access management unit 410 executes a process 600 for distributing the authentication ID 421-3 registered in the access control unit 320 of the storage device 300 (Step S516) and transmits the authentication ID capture reply 411 to which the registered authentication ID 421-3 is set, to the authentication ID management unit 130 (Step S517).

When the authentication ID management unit 130 receives the authentication ID capture reply 411 therein (Step S502), the authentication ID management unit 130 confirms whether the authentication ID is Null (Step S503). If it is found that the authentication ID is not Null (the answer is found to be No of Step S503), then the authentication ID management unit 130 registers the access list in which the capture of an authentication ID is required thereby, and the captured authentication ID in the authentication ID management table 131 (Step S504). If the authentication ID is Null (the answer is found to be Yes of Step S503), then the authentication ID cannot be captured and hence the present process is terminated as it is.

Figure 7:
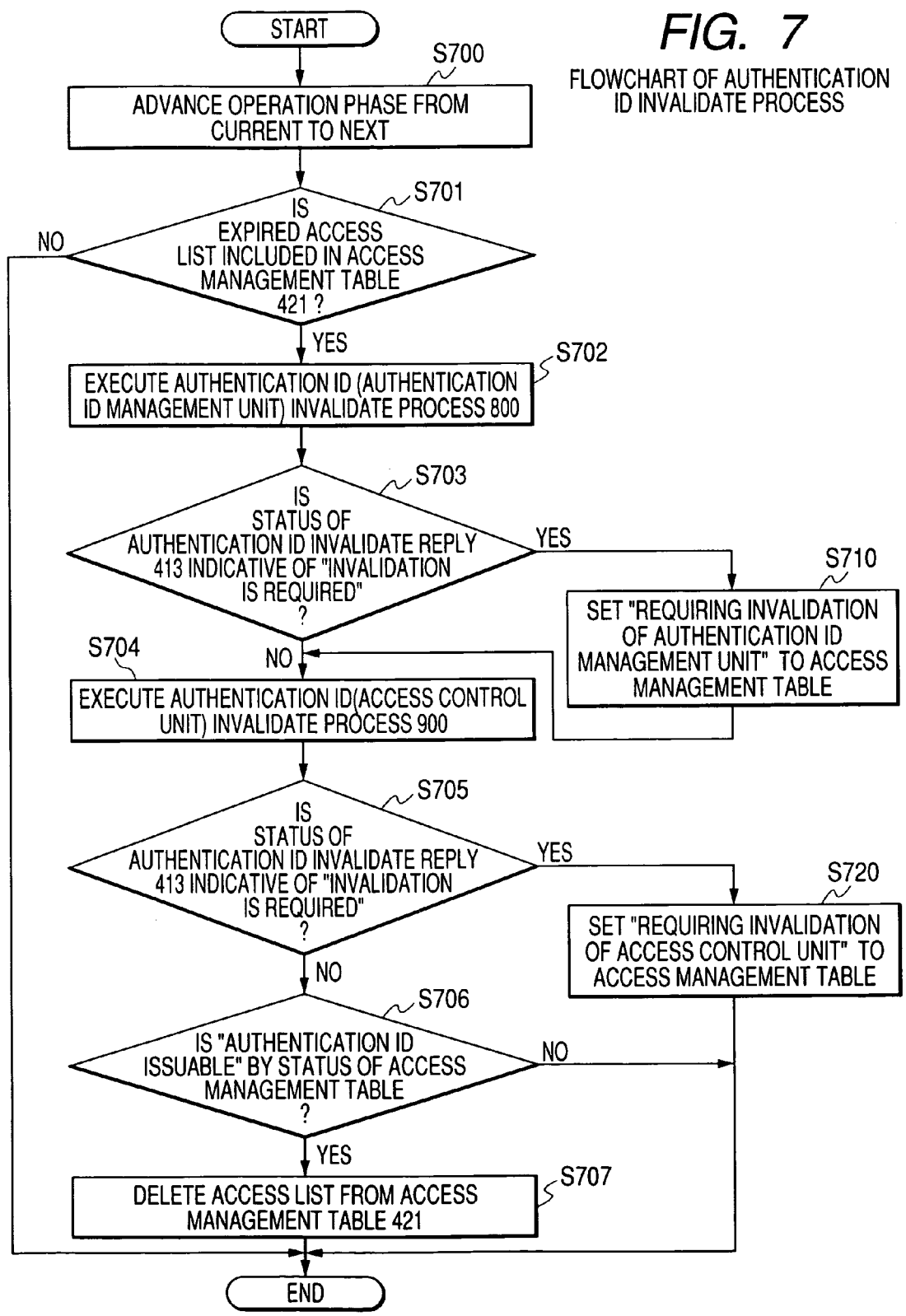
FIG. 7 is a flowchart illustrating an example of an authentication ID invalidate process according to the embodiment.

Incidentally, when the operation phase is advanced at Step S700 of FIG. 7 to be described later, the access management table 421 registered under the previous operation phase might become effective as it is. At this time, the new generation of authentication ID (Step S514) and the registration of the access management table 421 (Step S515) become unnecessary.

Figure 6:
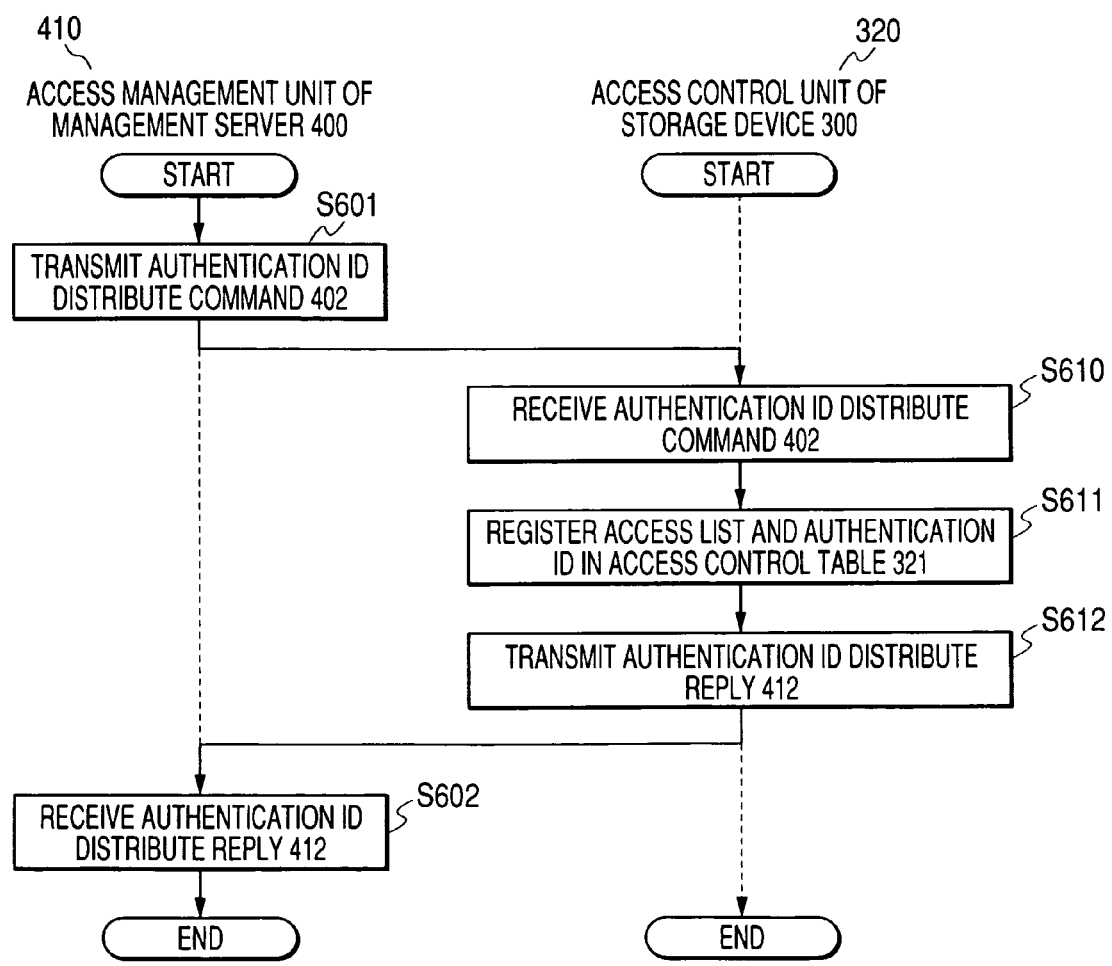
FIG. 6 is a flowchart showing an example of an authentication ID distribute process according to the embodiment.

An authentication ID distribute process according to the present embodiment will be explained with reference to a flowchart shown in FIG. 6. The authentication ID distribute process 600 is performed between the access management unit 410 of the management server 400 and the access control unit 320 of the storage device 300.

First, the access management unit 410 transmits an authentication ID distribute command 402 to the access control unit 320 (Step S601). When the access control unit 320 receives the authentication ID distribute command 402 therein (Step S610), the access control unit 320 registers an access list and an authentication ID designated by the authentication ID distribute command 402 in the corresponding access control table 321 (Step S611), and transmits an authentication ID distribute reply 412 with registration completion set to registration state data 412-2 to the access management unit 410 (Step S612). The access management unit 410 receives the authentication ID distribute reply 412 from the access control unit 320 (Step S602).

An authentication ID invalidate process according to the present embodiment will be explained with reference to a flowchart shown in FIG. 7. The authentication ID invalidate process is executed in the access management unit 410 of the management server 400.

First, the access management unit 410 allows an operation phase to proceed from "Current" to "Next" on the operation schedule table 420 in accordance with the elapse of time and the contents of a reply from the server 100, etc. (Step S700). If "Next" included in the expiration phase 421-2 exists in the access management table 421 at this time, then the access management unit 410 sets "authentication ID issuable" to the status 421-6. Then, the access management unit 410 confirms whether an access list whose expiration phase has elapsed (whose expiration phase is indicative of "Current") exists in the access management table 421 (Step S701). When the expired access list exists (the answer is found to be Yes of Step S701), the access management unit 410 executes an authentication ID (authentication ID management unit) invalidate process 800 for invalidating the authentication ID held by the authentication ID management unit 130 (Step S702). As a result of execution of the authentication ID (authentication ID management unit) invalidate process 800, the access management unit 410 confirms whether the status 413-2 of the received authentication ID invalidate reply 413 is of "Invalidation is required" (Step S703). When it is not placed in the state of "Invalidation is required" (when invalidation completion is taken) (the answer is found to be No of Step S703), the access management unit 410 executes an authentication ID (access control unit) invalidate process 900 (Step S704). When it is placed in the state of "Invalidation is required" (the answer is found to be Yes of Step S703), the access management unit 410 sets "requiring invalidation of authentication ID management unit" to the status 421-6 of the access management table 421 (Step S710) and executes the authentication ID (access control unit) invalidate process 900 (Step S704).

As a result of execution of the authentication ID (access control unit) invalidate process 900, the access management unit 410 confirms whether the status 413-2 of the received authentication ID invalidate reply 413 is of "Invalidation is required" (Step S705). If the status 413-2 is of "Invalidation is required" (the answer is found to be Yes of Step S705), then the access management unit 410 sets "Requiring invalidation of access control unit" to the status 421-6 of the access management table 421 (Step S720) and terminates the corresponding process. When the status 413-2 is not of "Invalidation is required" ("Invalidation completion is taken") (the answer is found to be No of Step S705), the access management unit 410 confirms whether the status 421-6 of the access management table 421 is "authentication ID issuable" (Step S706). This means confirming whether the access list 421-1 is in operation. When the status 421-6 is of "authentication ID issuable" (it is not in execution) (the answer is found to be Yes of Step S706), the access management unit 410 deletes the access list from the access management table 421 (Step S707). When the status 421-6 is not of "authentication ID issuable" (it is in execution) (the answer is found to be No of Step S706), the access management unit 410 terminates the corresponding process as it is.

Figure 8:
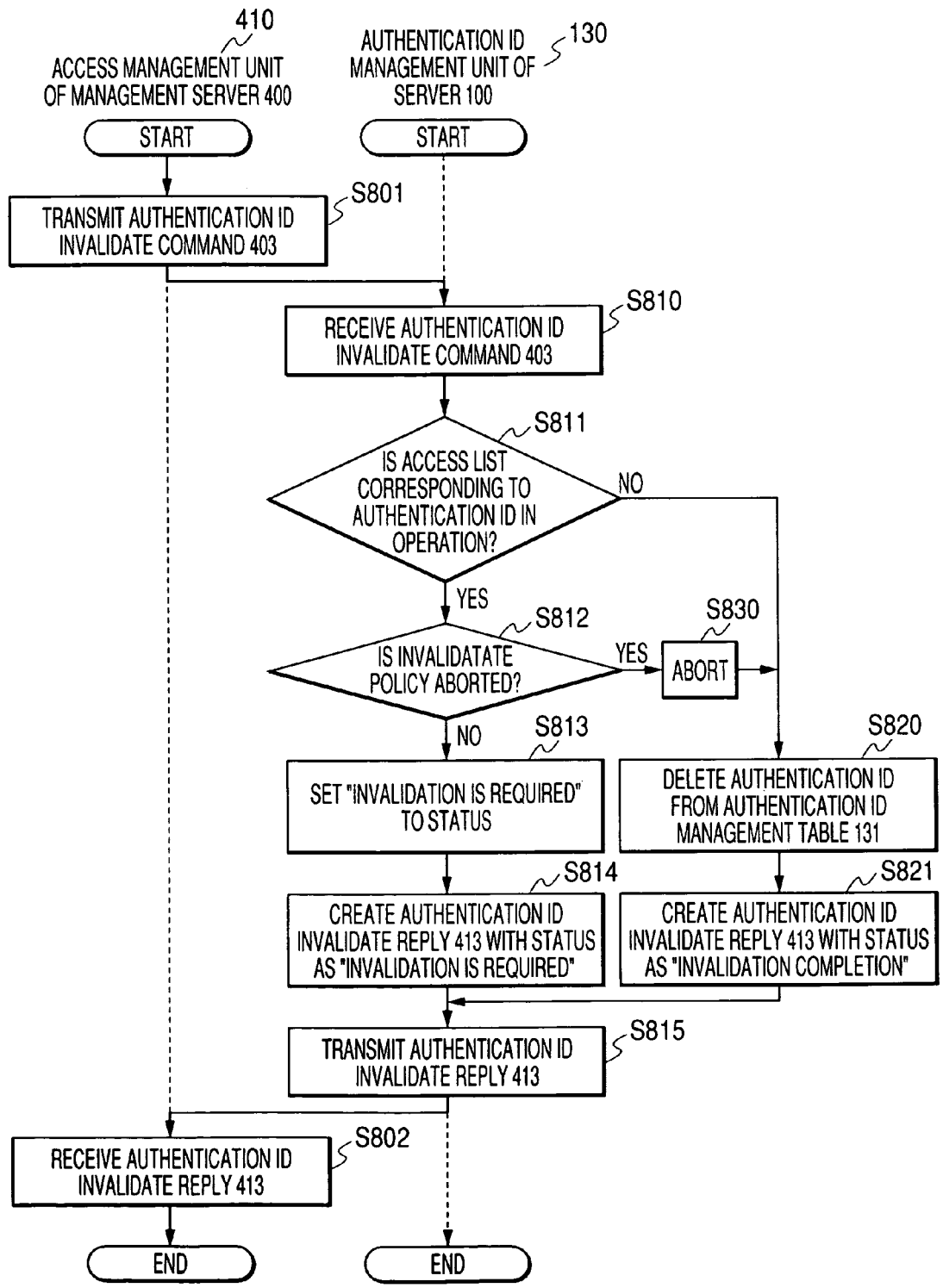
FIG. 8 is a flowchart depicting an example of an authentication ID (authentication ID management unit) invalidate process according to the embodiment.

An authentication ID (authentication ID management unit) invalidate process according to the present embodiment will be explained with reference to a flowchart shown in FIG. 8. The authentication ID (authentication ID management unit) invalidate process is performed between the access management unit 410 of the management server 400 and the authentication ID management unit 130 of the server 100.

First, the access management unit 410 transmits an authentication ID invalidate command 403 to the authentication ID management unit 130 (Step S801). When the authentication ID management unit 130 receives the authentication ID invalidate command 403 therein (Step S810), the authentication ID management unit 130 confirms by reference to the status 131-3 of the authentication ID management table 131 whether an access list corresponding to a designated authentication ID is in operation (Step S811). When the access list is not in operation (the answer is found to be No of Step S811), the authentication ID management unit 130 deletes the corresponding authentication ID from the authentication ID management table 131 (Step S820), creates an authentication ID invalidate reply 413 with the status 413-2 as "Invalidation completion" (Step S821), and transmits it to the access management unit 410 (Step S815).

When the access list corresponding to the designated authentication ID is in operation (the answer is found to be Yes of Step S811), then the authentication ID management unit 130 confirms whether the invalidate policy of the corresponding access list is aborted (Step S812). When the invalidate policy is aborted (the answer is found to be Yes of Step S812), execution of the access list is aborted (Step S830). Then, the authentication ID management unit 130 deletes the corresponding authentication ID from the authentication ID management table 131 (Step S820), creates an authentication ID invalidate reply 413 with the status 413-2 as "Invalidation completion" (Step S821), and transmits it to the access management unit 410 (Step S815).

On the other hand, when the invalidate policy is not aborted (Invalidation is required) (the answer is found to be No of Step S812), the authentication ID management unit 130 sets "Invalidation is required" to the status 131-3 of the authentication ID management table 131 (Step S813), creates an authentication ID invalidate reply 413 with the status 413-2 as "Invalidation is required" (Step S814), and transmits it to the access management unit 410 (Step S815).

The access management unit 410 receives the authentication ID invalidate reply 413 from the authentication ID management unit 130 (Step S802).

Figure 9:
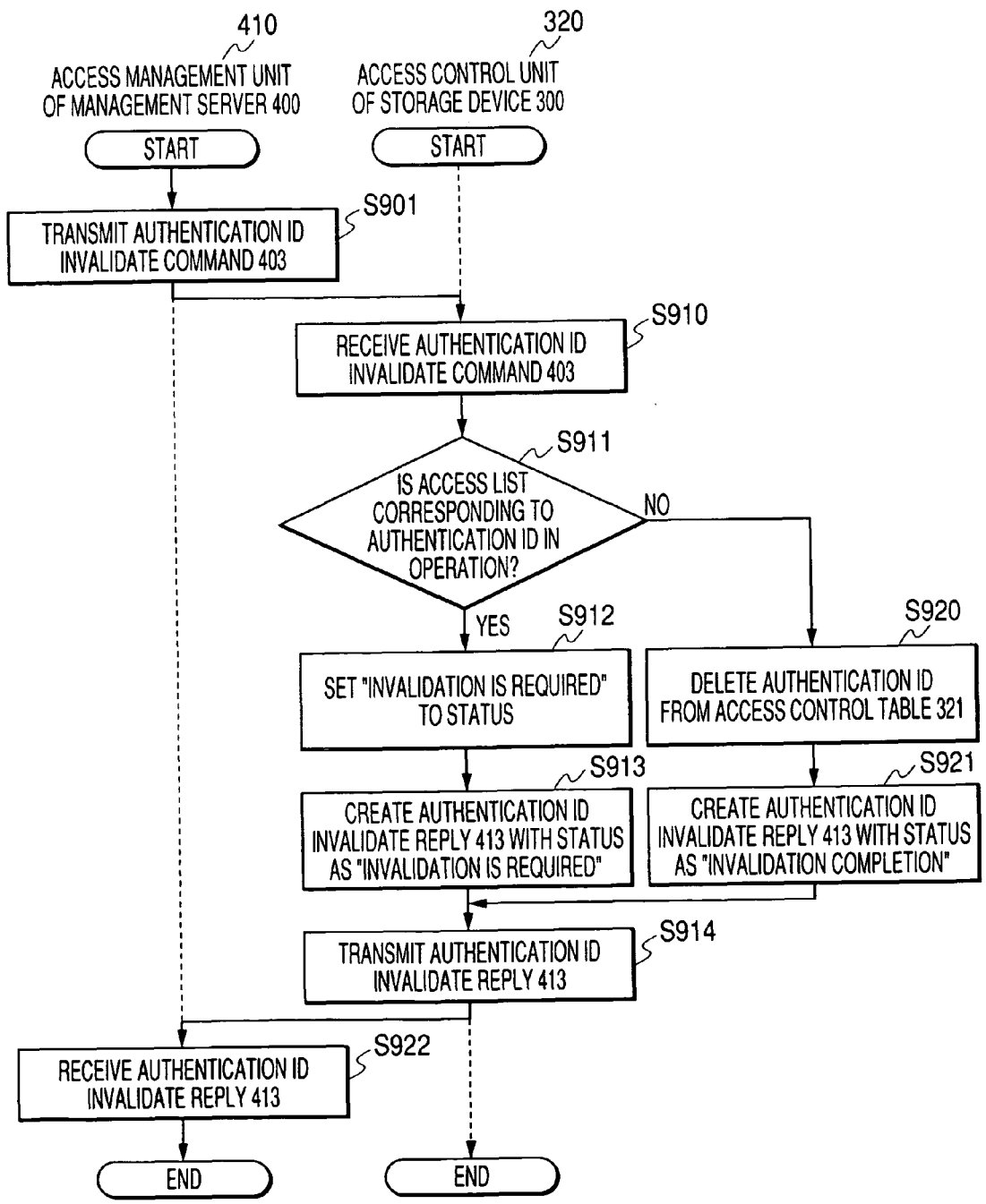
FIG. 9 is a flowchart showing an example of an authentication ID (access control unit) invalidate process according to the embodiment.

An authentication ID (access control unit) invalidate process according to the present embodiment will be explained with reference to a flowchart shown in FIG. 9. The authentication ID (access control unit) invalidate process 900 is carried out between the access management unit 410 of the management server 400 and the access control unit 320 of the storage device 300.

First, the access management unit 410 transmits an authentication ID invalidate command 403 to the access control unit 320 (Step S901). When the authentication ID invalidate command 403 is received (Step S910), the access control unit 320 confirms by reference to the status 321-3 of the access control table 321 whether an access list corresponding to a designated authentication ID is in operation (Step S911). When the access list is not in operation (the answer is found to be No of Step S911), the access control unit 320 deletes the corresponding authentication ID from the access control table 321 (Step S920), creates an authentication ID invalidate reply 413 with the status 413-2 as "Invalidation completion" (Step S921), and transmits it to the access management unit 410 (Step S914).

When the access list corresponding to the designated authentication ID is in operation (the answer is found to be Yes of Step S911), the access control unit 320 sets the corresponding status 321-3 to "Invalidation is required" (Step S912), creates an authentication ID invalidate reply 413 with the status 413-2 as "Invalidation is required" (Step S913), and transmits it to the access management unit 410 (Step S914).

The access management unit 410 receives the corresponding ID invalidate reply 413 from the access control unit 320 (Step S922).

Figure 10:
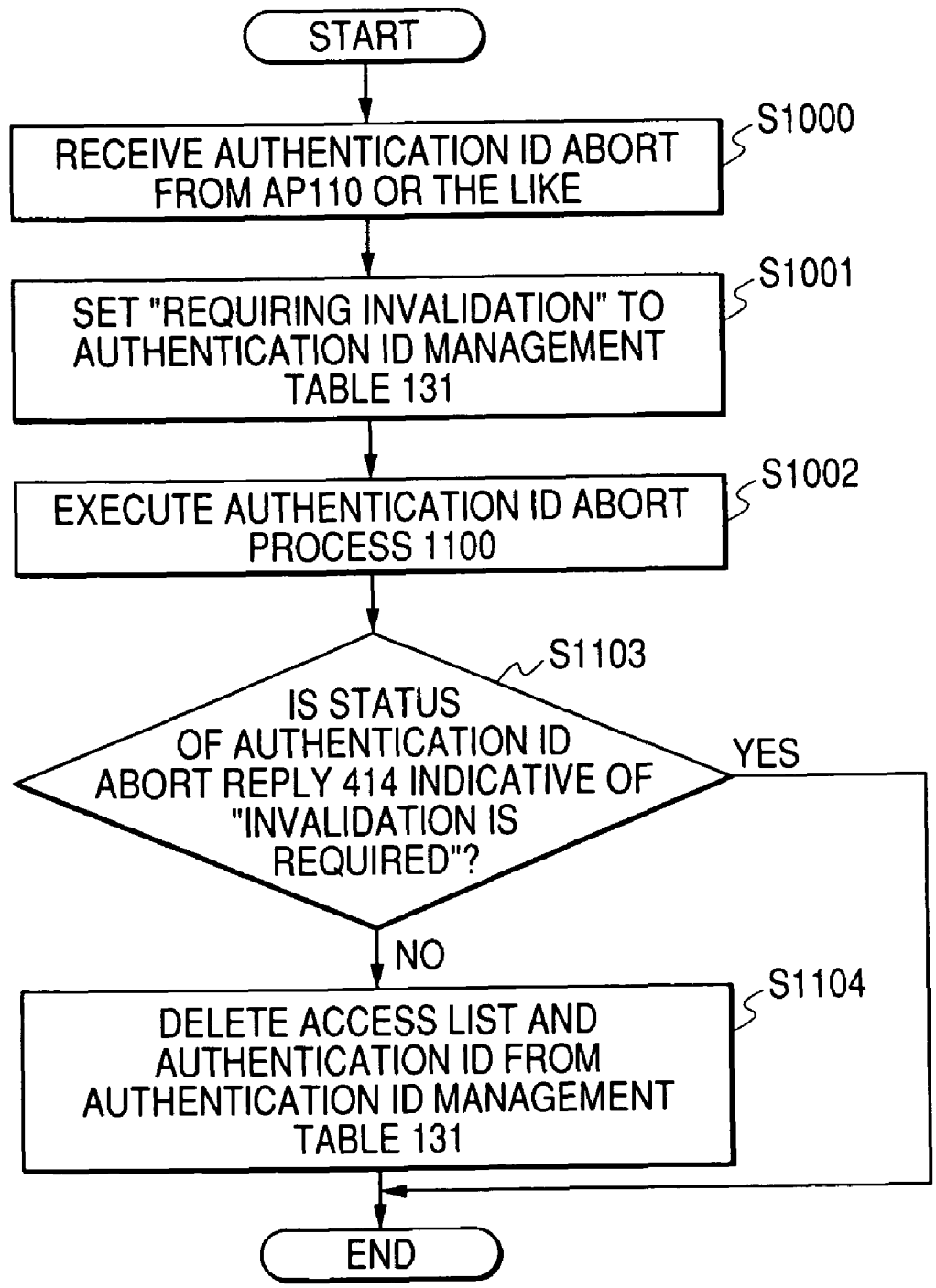
FIG. 10 is a flowchart illustrating an example of an authentication ID abort process according to the embodiment.

An authentication ID abort process according to the present embodiment will be explained with reference to a flowchart shown in FIG. 10. The authentication ID abort process is executed in the authentication ID management unit 130 of the server 100.

First, when an authentication ID abort is received from the AP 110 (e.g., a settlement program strict in access right) or the like (Step S1000), the authentication ID management unit 130 sets "Requiring invalidation" to the status 131-3 of the designated authentication ID of the authentication ID management table 131 (Step S1001) and executes the authentication ID abort process 1100 (Step S1002). As a result of execution of the authentication ID abort process 1100, the authentication ID management unit 130 confirms whether the status 414-2.of the received authentication ID abort reply 414 is of "Invalidation is required" (Step S1103). When it is not of "Invalidation is required" ("Invalidation completion") (the answer is found to be No of Step S1103), the authentication ID management unit 130 deletes the access list 131-1 and authentication ID 131-2 from the authentication ID management table 131 (Step S1104). When it is of "Invalidation is required" (the answer is found to be Yes of Step S1103), the authentication ID management unit 130 terminates the process as it is.

Figure 11:
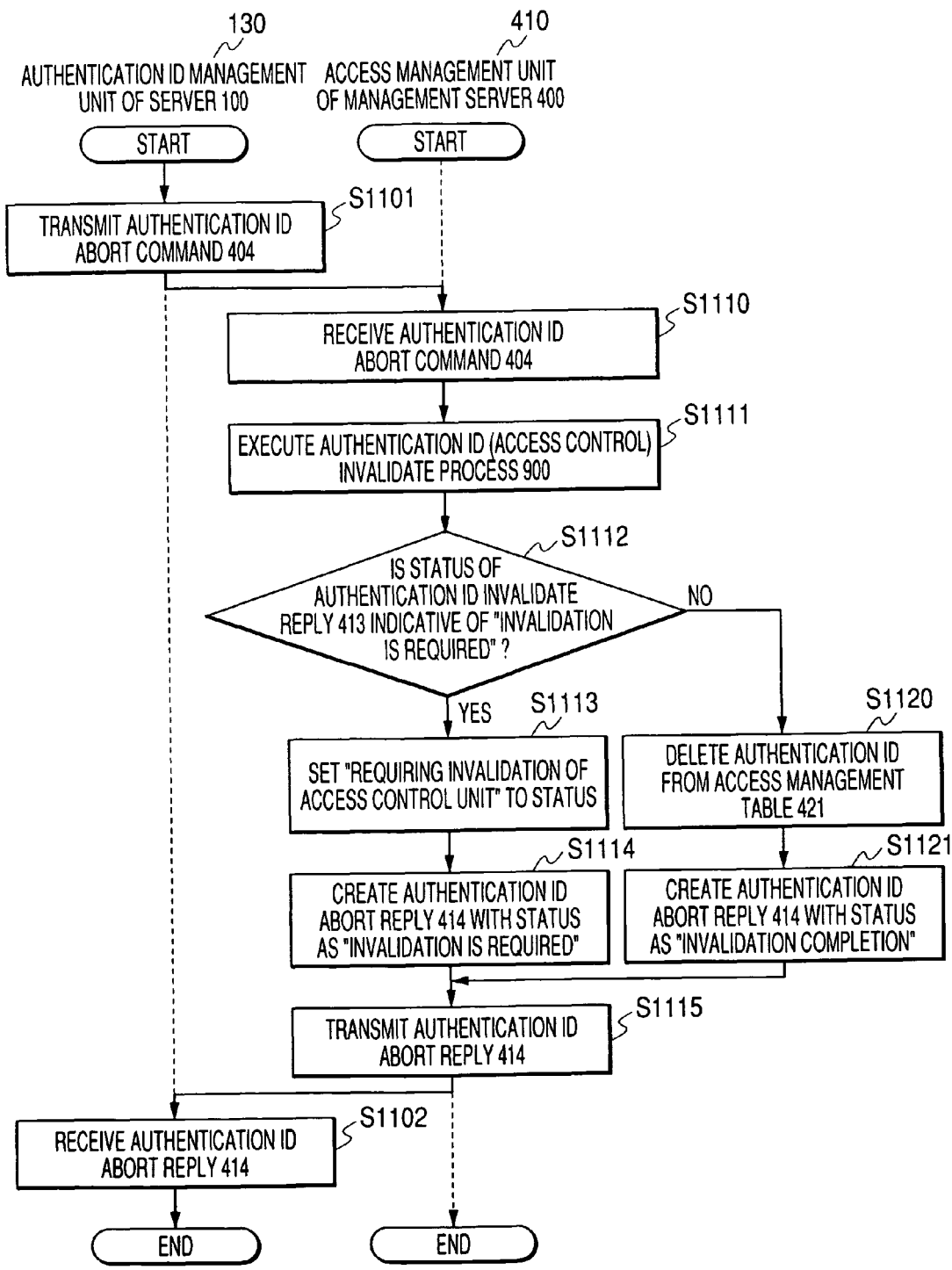
FIG. 11 is a flowchart showing an authentication ID abort process according to the embodiment.

An authentication ID abort process according to the present embodiment will be explained with reference to a flowchart shown in FIG. 11. The authentication ID abort process 1100 is performed between the authentication ID management unit 130 of the server 100 and the access management unit 410 of the management server 400.

First, the authentication ID management unit 130 transmits an authentication ID abort command 404 to the access management unit 410 (Step S1101). When the authentication ID abort command 404 is received (Step S1110), the access management unit 410 executes an authentication ID (access control unit) invalidate process 900 (Step S1111). As a result of execution of the authentication ID (access control unit) invalidate process 900, the access management unit 410 confirms whether the status 413-2 of the received authentication ID invalidate reply 413 is of "Invalidation is required" (Step S1112). When it is not of "Invalidation is required" ("Invalidation completion is taken") (the answer is found to be No of Step S1112), the access management unit 410 deletes the corresponding authentication ID from the access management table 421 (Step S1120), creates an authentication ID abort reply 414 with the status 414-2 as Invalidation completion (Step S1121), and transmits it to the authentication ID management unit 130 (Step S1115). When the status is of "Invalidation is required" (the answer is found to be Yes of Step S1112), the access management unit 410 sets "Requiring invalidation of access control unit" to the corresponding status 421-6 of the access management table 421 (Step S1113), creates an authentication ID abort reply 414 with the status 414-2 as Invalidation is required (Step S1114), and transmits the authentication ID abort reply 414 to the authentication ID management unit 130 (Step S1115).

The authentication ID management unit 130 receives the authentication ID abort reply 414 from the access management unit 410 (Step S1102).

Figure 12:
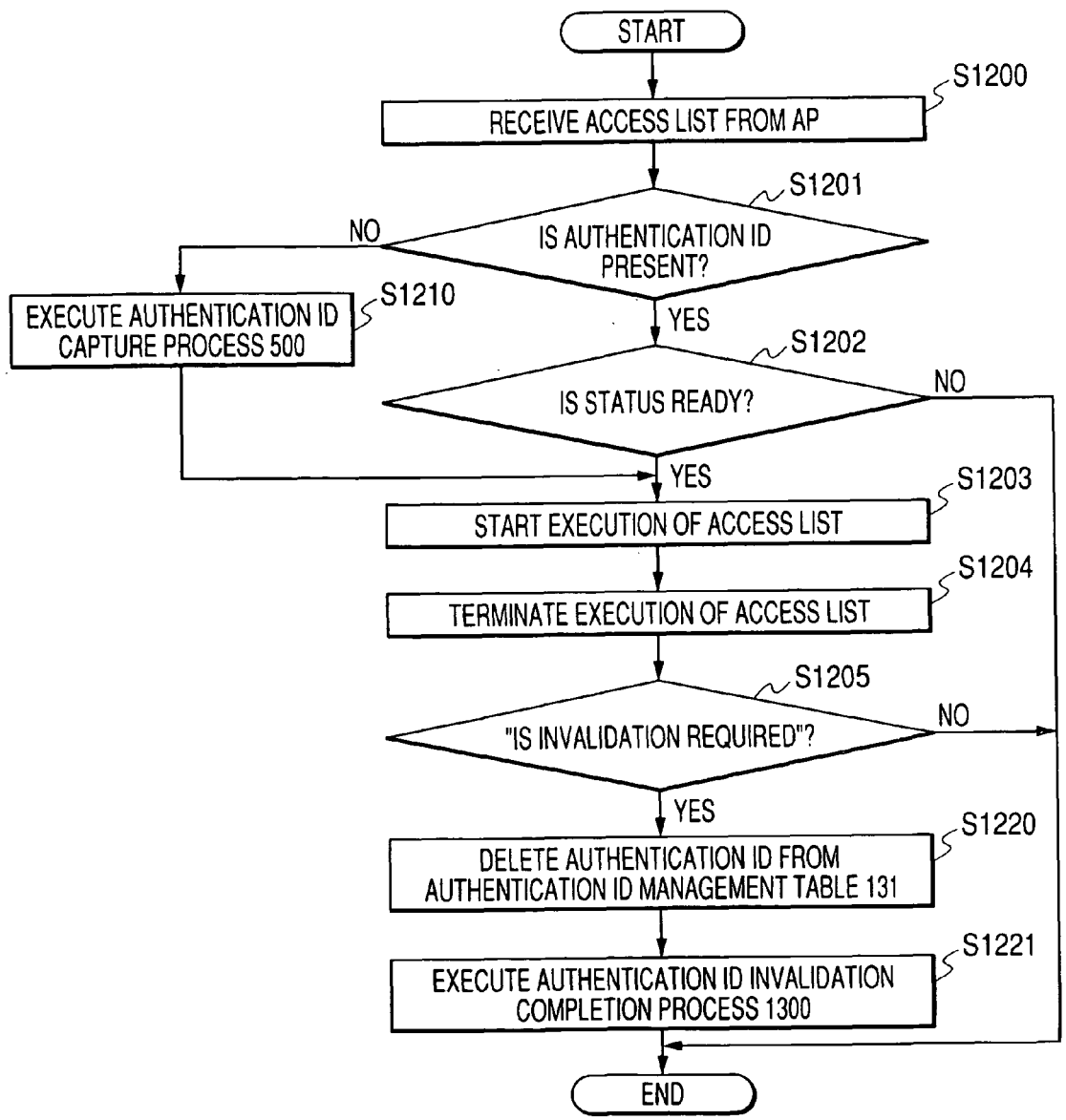
FIG. 12 is a flowchart illustrating an example of an access list execution process according to the embodiment.

An access list execution process according to the present embodiment will be described with reference to a flowchart shown in FIG. 12. The access list execution process is executed in the device control processor 120 of the server 100.

First, when the corresponding access list is received from the AP 110 (Step S1200), the device control processor 120 inquires of the authentication ID management unit 130 about whether the authentication ID of the corresponding access list is registered (Step S1201). When the authentication ID is not registered (the answer is found to be No of Step S1201), the authentication ID management unit 130 executes an authentication ID capture process 500 (Step S1210). Then, the device control processor 120 executes the access list after capturing of the authentication ID (Steps S1203 and S1204). When the authentication ID of the received access list is registered (the answer is found to be Yes of Step S1201), the device control processor 120 inquires of the authentication ID management unit 130 about it and confirms whether the status 131-3 of the authentication ID is "Ready" (Step S1202). When it is "Ready" (the answer is found to be Yes of Step S1202), the device control processor 120 executes the corresponding access list (Steps S1203 and S1204). After execution of the access list, the device control processor 120 inquires of the authentication ID management unit 130 about whether the status 131-3 of the authentication ID is "Invalidation is required" (Step S1205). When it is of "Invalidation is required" (the answer is found to be Yes of Step S1205), the authentication ID management unit 130 deletes the corresponding authentication ID from the authentication ID management table 131 (Step S1220) and executes an authentication ID invalidation completion process 1300 (Step S1221).

Incidentally, when the status is not of "Ready" (the answer is found to be No of Step S1202) or when the status of the authentication ID is not "Invalidation is required" (the answer is found to be No of Step S1205), the corresponding process is terminated as it is.

Figure 13:
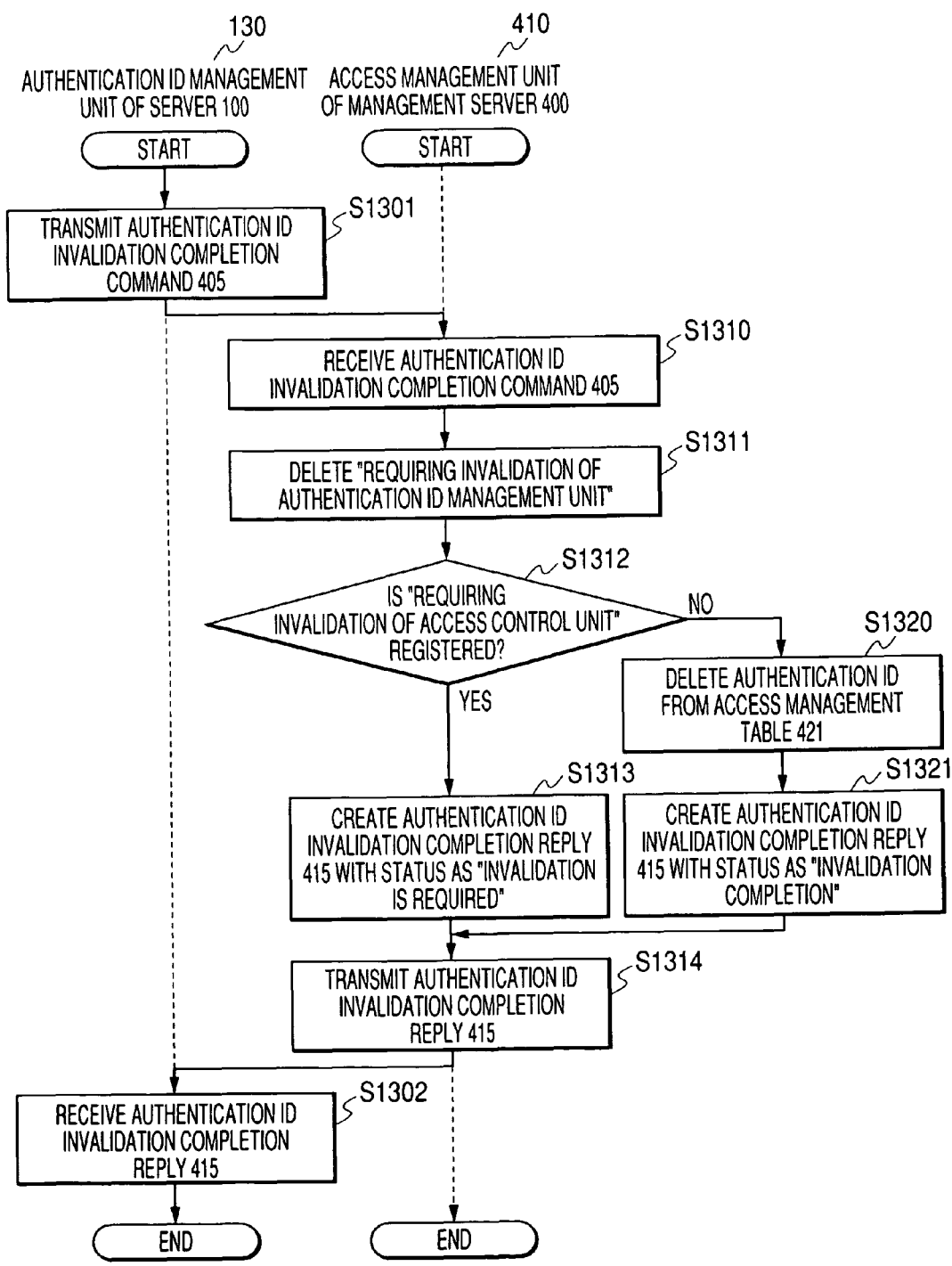
FIG. 13 is a flowchart depicting an example of an authentication ID invalidation completion process according to the embodiment.

An authentication ID invalidation completion process according to the present embodiment will be explained with reference to a flowchart shown in FIG. 13. The authentication ID invalidation completion process 1300 is performed between the authentication ID management unit 130 of the server 100 and the access management unit 410 of the management server 400.

First, the authentication ID management unit 130 transmits an authentication ID invalidation completion command 405 to the access management unit 410 (Step S1301). When the authentication ID invalidation completion command 405 is received (Step S1310), the access management unit 410 deletes "Requiring invalidation of authentication ID management unit" from the corresponding status 421-6 of the authentication ID designated by the authentication ID invalidation completion command 405 in the access management table 421 (Step S1311) and confirms whether "Requiring invalidation of access control unit" is being registered (Step S1312). When it is not registered (the answer is found to be No of Step S1312), the access management unit 410 deletes the corresponding authentication ID form the access management table 421 (Step S1320), creates an authentication ID invalidation completion reply 415 with the corresponding status 415-2 set as "Invalidation completion" (Step S1321), and transmits it to the authentication ID management unit 130 (Step S1314).

On the other hand, when "Requiring invalidation of access control unit" is registered, the access management unit 410 creates an authentication ID invalidation completion reply 415 with the status 415-2 set as "Invalidation is required" (Step S1313), and transmits it to the authentication ID management unit 130 (Step S1314).

The authentication ID management unit 130 receives the authentication ID invalidation completion reply 415 from the access management unit 410 (Step S1302).

An access list execution process according to the present embodiment will be explained with reference to a flowchart shown in FIG. 14. The access list execution process is executed in the port controller 310 of the storage device 300.

First, when the corresponding access list is received from the device control processor 120 of the server 100 (Step S1400), the port controller 310 inquires of the access control unit 320 about whether the authentication ID of the access list is registered in the corresponding access control table 321 (Step S1401). When the authentication ID is being registered in the access control table 321 (the answer is found to be Yes of Step S1401), the port controller 310 confirms whether the corresponding status 321-3 is "Ready" (Step S1402). When it is "Ready" (the answer is found to be Yes of Step S1402) the port controller 310 executes the corresponding access list (Steps S1403 and S1404). Incidentally, when no authentication ID is registered in the access control table 32i (the answer is found to be No of Step S1401) or when the status 321-3 is not "Ready" (the answer is found to be No of Step S1402), the port controller 310 terminates the process without executing the access list.

After execution of the access list, the port controller 310 confirms with respect to the access control unit 320 whether the authentication ID of the access list is set as "Invalidation is required" (Step S1405). When it is set as "Invalidation is required" (the answer is found to be Yes of Step S1405), the port controller 310 deletes the authentication ID from the access control table 321 (Step S1410) and executes an authentication ID invalidation completion process 1500 (Step S1411). When it is not set as "Invalidation is required" (the answer is found to be No of Step S1405), the port controller 310 terminates the corresponding process.

An authentication ID invalidate completion process according to the present embodiment will be explained with reference to a flowchart shown in FIG. 15. The authentication ID invalidation completion process 1500 is performed between the access control unit 320 of the storage device 300 and the access management unit 410 of the management server 400.

First, the access control unit 320 sends an authentication ID invalidation completion command 405 to the access management unit 410 (Step S1501). When the authentication ID invalidation completion command 405 is received (Step S1510), the access control unit 410 deletes "Requiring invalidation of access control unit" from the corresponding status 421-6 of the authentication ID designated by the authentication ID invalidation completion command 405 at the access management table 421 (Step S1511) and confirms whether "Requiring invalidation of authentication ID management unit" is registered (Step S1512). When it is not registered (the answer is found to be No of Step S1512), the access management unit 410 deletes the authentication ID from the access management table 421 (Step S1520), creates an authentication ID invalidation completion reply 415 with the corresponding status 415-2 set as "Invalidation completion" (Step S1521), and transmits it to the access control unit 320 (Step S1514).

On the other hand, when "Requiring invalidation of authentication ID management unit" is registered (the answer is found to be Yes of Step S1512), the access management unit 410 creates an authentication ID invalidation completion reply 415 with the corresponding status 415-2 set as "Invalidation is required" (Step S1513), and transmits it to the access controller 320 (Step S1514).

The access control unit 320 receives the authentication ID invalidation completion reply 415 from the access management unit 410 (Step S1502).

Although the embodiment has been described above, the programs executed at the respective parts shown in FIG. 1 are recorded in a recording medium readable by a computer, and the programs recorded in the recording medium are read in a computer system and executed, whereby the storage network system according to the present embodiment is realized.

Although one embodiment has been illustrated above as one example, the present invention is not limited to the embodiment. Changes can suitably be made thereto within the scope not departing from the gist of the present invention. For example, the following embodiments are considered.

(1) Although the access management unit 410 has been described as provided in the management server 400 in the embodiment, it is not necessarily limited to the management server 400. For example, the access management unit 410 may be configured so as to be provided in the server 100 or the storage device 300. According to this configuration, there is no need to add the management server 400 to the system configuration of the server 100, network 200 and storage device 300, and thereby the cost for constructing the storage network system 1 can be reduced.

(2) Although the object for the data input/output process has been described so as to be defined as the device ID (number inherent in volume) in the operation contents of the access list in the embodiment, it may not be limited to the device ID if a logically specifiable access range is taken in the storage device 300. For example, it may take a file name in the volume or a logical block address range in the volume. According to this idea, an authentication ID can be generated corresponding to the limited access range, and such strict access control as to permit an actually-necessary access alone can be performed.

According to the present invention, the access control level of the storage device can be set independent of a server management environment. Therefore, it is possible promptly adapt to new law regulations related to data's access control. Since the access right of the same user can dynamically be changed in accordance to an operation schedule phase, unauthorized access can be prevented.

What I claim:

1. A system comprising:
   a server which executes an application program and issues a command related to the input/output of data with the execution thereof;
   a storage device which receives the command issued from the server and performs the input/output of data in accordance with the command;
   a network which connects the server and the storage device to one another; and
   a management server connected to the network;
   wherein the server transmits a request for an authentication ID corresponding to an access list comprising an identification of a requestor that requests an access to the storage device, a type of the access and a range intended for the access, to the management server,
   wherein the management server has information related to a schedule of processes executed on the storage device, and the management server determines based on information on the type of access included in the access list and the information on the schedule whether the authentication ID is granted, creates the authentication ID on the basis of the result thereof, and transmits the authentication ID to the server,
   wherein the server obtains access to the storage device, using the authentication ID received from the management server;
   wherein the management server creates a second authentication ID corresponding to the authentication ID upon creation of the authentication ID and transmits the second authentication ID to the storage device, wherein the storage device authenticates an access received from the server by using the second authentication ID received from the management server;

wherein when the authentication ID created in association with the second authentication ID is contained in the command received from the server, the storage device permits an access from the server;

wherein the server confirms whether the server per se has information on the authentication ID for the access list before the request for the authentication ID is transmitted to the management server; and wherein the management server has information related to a schedule of processes executed on the storage device, and the management server compares the information on the type of access contained in the access list and the information on the schedule and transmits the authentication ID to the server when the type of access coincides with the schedule.

2. A system according to claim 1, wherein the management server determines based on the information on the schedule whether the authentication ID transmitted to the server or the second authentication ID transmitted to the storage device is valid, and transmits a request for deletion of the authentication ID or the second authentication ID to the server or the storage device when the authentication ID or the second authentication ID is invalid.

3. A system according to claim 2, wherein when the corresponding process related to the access list corresponding to the authentication ID is in execution where the request for deletion thereof is received from the management server, the server holds the deletion of the authentication ID until the process being in execution is ended.

4. A system according to claim 2, wherein when the request for deletion thereof is received from the management server, the server deletes the authentication ID even though the process related to the access list corresponding to the authentication ID is in execution.

5. A system according to claim 2, wherein when the corresponding process related to the access list corresponding to the authentication ID is in execution where the request for deletion thereof is received from the management server, the storage device holds the deletion of the second authentication ID until the process being in execution is ended.

6. A system according to claim 1, wherein the server transmits a request for deletion of the authentication ID to the management server, and wherein the management server deletes the information on the authentication ID from the management server on the basis of the deletion request received from the server.

7. A system according to claim 6, wherein when the information on the authentication ID is deleted based on the deletion request received from the server, the management server transmits the request for deletion of the second authentication ID corresponding to the authentication ID to the storage device.

8. A system comprising:

a server which executes an application program and issues an access list related to the input/output of data with the execution thereof;

a storage device which receives an access list issued from the server and performs the input/output of data in accordance with the access list;

a management server which performs management related to an access from the server to the storage device; and a network which interconnects the server, the storage device and the management server;

wherein the server is equipped with an application program with the input/output of data and a device control processor which issues the access list in accordance with an access request from the application program to the storage device, wherein the device control processor includes an authentication ID management unit which controls an access to the storage device, wherein the authentication ID management unit holds an authentication ID management table including a correspondence between the access list and a corresponding authentication ID required of the management server and received therein for the need of operation of the access list, and adds an authentication ID corresponding to the access list by reference to an authentication ID management table when the access list is issued to the storage device, wherein the storage device includes at least a port controller which receives an access list from the server and performs the transfer of data in accordance with the access list, a cache memory which temporarily stores the data transferred from the port controller, hard disk drives each of which stores the data transferred from the cache memory, and a disk controller which controls the transfer of the data between the cache memory and each hard disk drive, all of which are configured so as to be connected to one another through an internal network, wherein the port controller includes an access control unit which controls an access from the server, wherein the access control unit holds an access control table including a correspondence between an access list received from the management server and a corresponding authentication ID necessary for operation of the access list, and when the access list is received from the server, the access control unit permits execution of the access list by reference to the access control table when a combination of the received access list and the authentication ID added thereto exists, wherein the management server is provided with an access management unit which manages an access from the server to the storage device in accordance with an operation phase, and wherein the access management unit holds an operation schedule table indicative of access lists allowed under a predetermined operation phase and an access management table including a correspondence between the access list and a corresponding authentication ID necessary for operation thereof, and when a request for an authentication ID with respect to the access list is made from the server and when the received access list is contained in the access lists allowed under the operation phase at that time, the access management unit generates an authentication ID corresponding to the access list by reference to the operation schedule table, sets the access list and the authentication ID to the access management table, transmits the access list and the authentication ID to the storage device, and transmits the authentication ID to the server.

* * * * *